US007690538B2

(12) United States Patent
Dunlop et al.

(10) Patent No.: US 7,690,538 B2
(45) Date of Patent: Apr. 6, 2010

(54) APPARATUS AND METHOD FOR MOVING AND PLACING GRANULATE MATERIAL

(76) Inventors: Richard Dunlop, 23332 Madero, Suite A, Mission Viejo, CA (US) 92691; Robert Griffin, 2185 Station Village Way #2427, San Diego, CA (US) 92706; Steven C. Stokes, 613 Rhine La., Costa Mesa, CA (US) 92626; Denis A. Stokes, 2521 N. Spurgeon St., Santa Ana, CA (US) 92706; Gary Bonney, 2124 Montery Pennisula, Corona, CA (US) 92871

( * ) Notice: Subject to any disclaimer, the term of this patent is extended or adjusted under 35 U.S.C. 154(b) by 169 days.

(21) Appl. No.: 11/906,723

(22) Filed: Oct. 3, 2007
(Under 37 CFR 1.47)

(65) Prior Publication Data
US 2008/0038070 A1 Feb. 14, 2008

Related U.S. Application Data

(60) Division of application No. 11/475,677, filed on Jun. 27, 2006, now Pat. No. 7,303,362, which is a continuation-in-part of application No. 10/340,214, filed on Jan. 9, 2003, now Pat. No. 7,094,004.

(51) Int. Cl.
*G01F 11/10* (2006.01)

(52) U.S. Cl. ...................................... 222/367; 222/636
(58) Field of Classification Search ................. 222/367, 222/636; 406/63, 68, 124, 127, 128, 145, 406/146
See application file for complete search history.

(56) References Cited

U.S. PATENT DOCUMENTS

| 3,161,442 | A | * | 12/1964 | Reed ............................ 406/63 |
| 5,150,991 | A | * | 9/1992 | Stoner et al. ................... 406/67 |
| 5,915,887 | A | * | 6/1999 | Sulman et al. ................. 406/63 |
| 6,336,774 | B1 | * | 1/2002 | Dunlop et al. ................. 406/43 |
| 6,554,546 | B2 | * | 4/2003 | Dunlop et al. ............... 406/197 |
| 7,094,004 | B2 | * | 8/2006 | Dunlop et al. ................. 406/68 |
| 7,303,362 | B2 | * | 12/2007 | Dunlop et al. ................. 406/42 |

* cited by examiner

*Primary Examiner*—Douglas A Hess

(57) ABSTRACT

A method and system are disclosed for moving and placing in hard to reach locations granular and other particulate material such as sand, gravel, earth and similar materials. The system includes an improved auger for moving the material and an improved rotary airlock mechanism designed to withstand the abrasive action of the particulate material and at the same time move the material several hundred feet through a flexible conduit for placement in a pre-designated location. A system and apparatus is also disclosed for transporting on one vehicle all of the devices needed at a remote site for operation the particulate placement system, including a front loader.

9 Claims, 22 Drawing Sheets

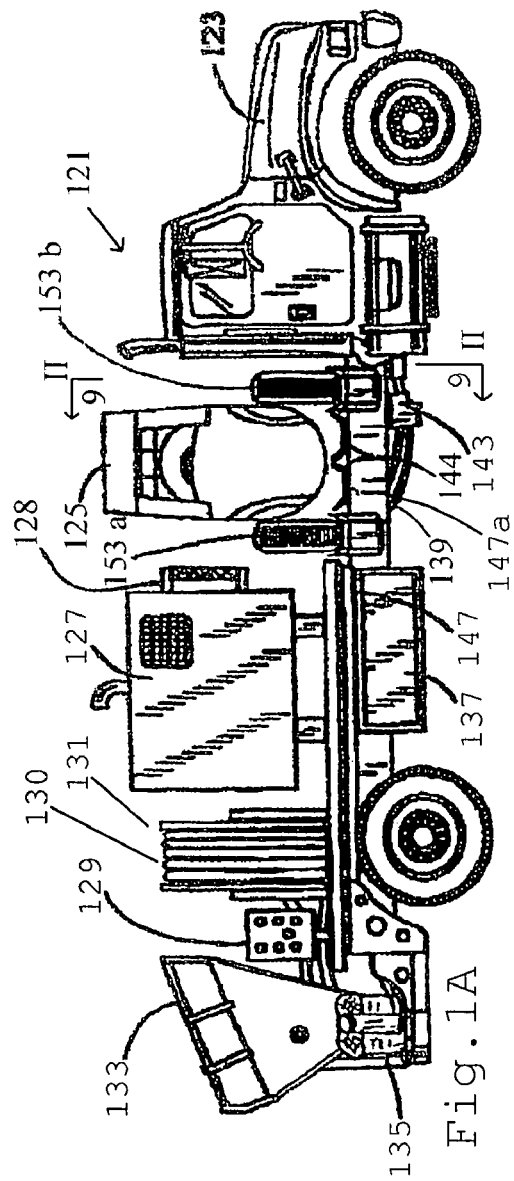
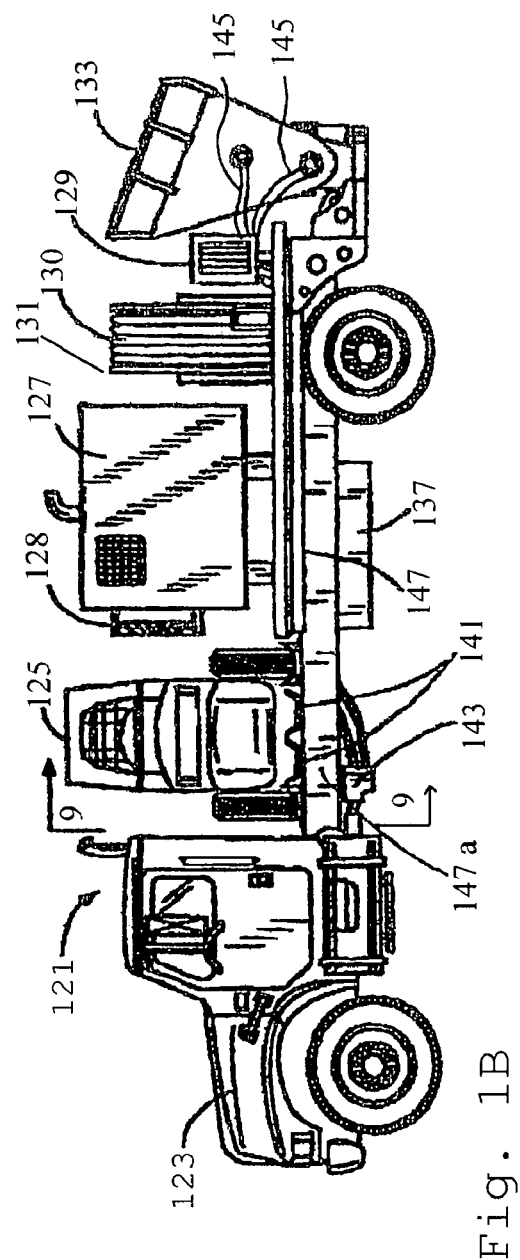

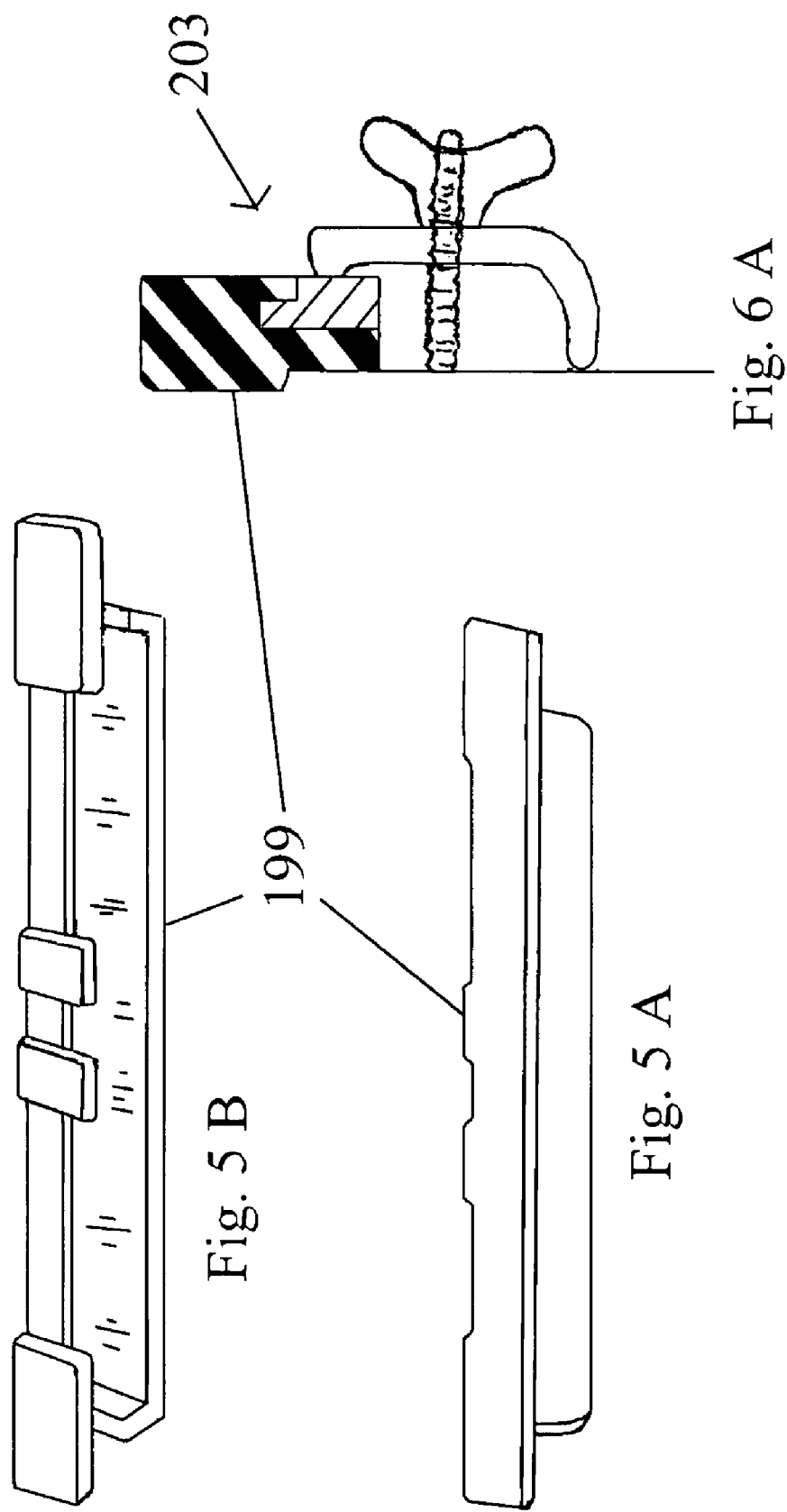

APPARATUS AND METHOD FOR MOVING AND PLACING GRANULATE MATERIAL

CROSS REFERENCE TO RELATED APPLICATION

This application is a Divisional application of application Ser. No. 11/475,677, filed 27 Jun. 2006, now U.S. Pat. No. 7,303,362, issued Dec. 4, 2007, which was a Continuation-in-Part of application Ser. No. 10/340,214, filed 9 Jan. 2003, now U.S. Pat. No. 7,094,004, issued 22 Aug. 2006, and the disclosure of which is incorporated herein by reference to the extent necessary for a full enabling disclosure of the present invention.

BACKGROUND OF THE INVENTION

1. Field of the Invention

This invention relates generally to the placement of granular materials and more specifically, to an Improved Apparatus and Method for Moving and Placing Granulate.

2. Description of Related Art

Sand, gravel and rock are used in a variety of applications for the construction industry. From aggregate base for concrete slabs, to back fill for retaining walls, granular materials, or granulates, are probably the most widely used substance, outside of concrete, in the construction industry. What has been a common problem has been moving the granulate from place to place when a dump truck and/or cranes and mechanical shovels do not have easy access.

Another application, namely the construction of concrete flatwork (slabs on grade and the like) typically require a 2- to 6-inch layer of sand, gravel or other granular material underneath a concrete slab. In these applications, a vapor barrier is often required in order to provide moisture protection. The material of choice for vapor barriers is typically of a size and material that is job-site-specific, and therefore delivered directly from the vendor to a location adjacent to the flatwork in progress. Since the vapor barrier and subsequent granulate installation are the final steps preceding the actual concrete pouring, they are not completed until all other mechanical, electrical lines and footing reinforcement bars have been installed. As such, heavy equipment cannot be driven over the pad (and lines and bars) because the lines and bars (and vapor barrier) would be disturbed. Because of this restriction, the granulate has heretofore been applied manually with wheelbarrows and shovels.

Furthermore, the process of concrete flatwork usually involves the installation of a perimeter forms for the slab (i.e. within which the concrete would be poured). These perimeter forms also interfere with the use of heavy equipment to load the granulate into the pad. What is needed is a device and method that permits the transfer of granulate into a concrete flatwork pad without disturbing the mechanical and electrical lines, the reinforcing bars, the vapor barrier or the perimeter forms.

A number of improvements have been made to mechanisms for the pumping sand and gravel. One such system is disclosed in U.S. Pat. No. 6,336,774, which is owned by the same entity that owns this application. That patent discloses a system that, among other things has a screw type auger that has an upward inclination and creates a constant even stream of gravel. U.S. Pat. No. 6,336,774 is hereby incorporated herein as set forth here, and at length. However, even this invention as disclosed herein has certain deficiencies.

An on going problem experienced by systems used for placing flowable material, in particular materials like sand and gravel, is the extreme wear and tear these abrasive materials cause to these systems. These abrasive materials rapidly break down and even destroy the parts of the handling systems. Additionally, even with various improvements a significant amount of inefficiencies exist in currently available systems. Leaks caused by the wear and tear of various parts of the system reduce significantly the operational characteristics of these systems. Additionally, problems still exist and significant improvements can still be made to improve the operational characteristics of these systems. Thus, it is a further object of the improved version of the present invention to achieve a significant increase in the efficiencies of the system and reduce occurrence and frequency of equipment break.

SUMMARY OF THE INVENTION

In light of the aforementioned problems associated with the prior devices and methods, it is an object of the present invention to provide an Improved Apparatus and Method for Moving and Placing Granulate. It is an object that the present invention provide a portable, self-contained apparatus capable of discharging granulate into hard-to-reach areas, as well as providing assistance in covering vast open areas with granulate in a short time. It is a further object that the device and method permit the application of granulate into areas that are normally inaccessible and would require many hours of human labor, and thereby potentially avoiding damage to the site that might be incurred if employing a prior method and device. It is a still further object that the present invention serve to provide discharge of granulate near or adjacent to retaining walls and underneath concrete flatwork.

In an aspect of the improved version of the present invention it provides A rotary air lock pump mechanism having: a) a material feed bowl with a plurality of chambers, the bowl being configured for rotational movement around a central axis of the bowl and a power source to rotate the bowl about the axis; b) a collection barrel positioned over an open end of the bowl with a central axis of the barrel being congruent with the central axis of the bowl, the barrel remaining fixed while said bowl rotates about the central axis, the barrel directing flowable material deposited into exposed ends of the chambers of the bowl; c) an air intake material ejection manifold that when positioned in a receiving recess on the barrel is serially presented to an open end of each chamber of the bowl as the bowl is rotated about the central axis and wherein when air is injected into an air receiving portion of the manifold it is injected into a chamber of the bowl being presented to the manifold and thereby causing flowable material deposited in the chamber to be ejected out through a material ejection portion of the manifold; d) a wear gasket positioned between a first side of a face plate of the manifold and the bowl, the gasket facilitating smooth rotation of the bowl; e) a pressure mechanism engagedly positioned against a second side of the face plate to assure even wear of the wear gasket and to thereby maintain a suitable seal between the face plate of the manifold and the bowl; and f) wherein as the bowl rotates flowable material is deposited through the barrel into a portion of the chambers the ends of which are exposed in the barrel and as each chamber is serially presented to the manifold, by rotation of the bowl, the flowable material is ejected by the manifold.

In yet another aspect of the present invention it provides a material handling mechanism having: a) a loading hopper with a first opening at a top end for receiving flowable material and a second opening at a bottom end for collecting and directing flowable material placed in the first opening; b) a compactor drive apparatus located below and adjacent to the second opening of the second opening of the hopper, the compactor drive apparatus forming the flowable material from the hopper into a steady and even stream; c) a rotary air lock pump mechanism for receiving the steady even stream created by the compactor drive apparatus, the rotary air lock pump mechanism having appropriate sealing and wear mechanisms to facilitate operation and prevent leakage of flowable material and even wear of moving parts; and d) a long flexible conduit connected to a material ejection conduit of the rotary air lock pump mechanism to place the flowable material in a pre-selected location. In a further aspect of the present invention it includes a mechanism to cool pressurized air being injected into the rotary air pump.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIGS. 1A and 1B are views of each side of an improved version of the self-propelled granulate placement system of the present invention;

FIG. 3A is a top view of the interior of the loading hopper;

FIG. 4A is a cross sectional view of one chamber of the bowl along line 11A;

FIG. 4B is a perspective view of the portion of FIG. 4A in circle 11B;

FIG. 5A is front view of the exterior blowout seal pad;

FIG. 5b is a perspective view of the exterior blow out seal pad FIG. 6 cross-sectional view of the rotary air lock system of FIG. 5 along plane VI-VI;

FIG. 7A is a perspective view of a deflector of the present invention;

FIG. 11A is a close up view of the cross-sectional area designated XIA in FIG. 11;

FIG. 11B is a close up of the cross-sectional area of the manifold identified as seen in FIG. 11;

DETAILED DESCRIPTION OF THE PREFERRED EMBODIMENTS

Figure 1C:
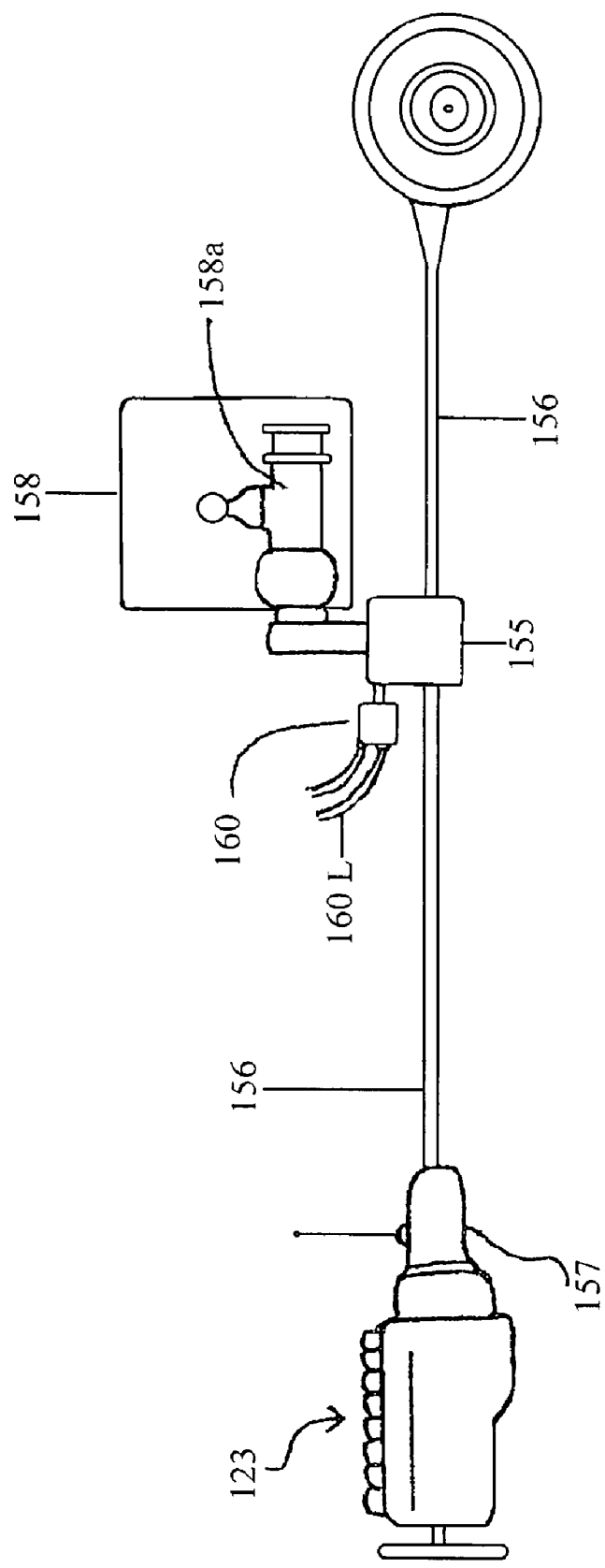
FIG. 1C is a schematic block diagram of one version of a power take off system for use with present invention.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an Improved Apparatus and Method for Moving and Placing Granulate.

FIG. 1A and FIG. 1B are views of both sides of an improved self-propelled granulate application system of the present invention. In one preferred embodiment the system is configured on a flatbed truck 121. In FIGS. 1A and 1B the truck 121 has the typical set up with it motor 123 located in the front. The unit also includes the following viewable on both sides of the truck: a tractor loader 125, air compressor 127, air cooler 128, for cooling air leaving compressor 127, control panel 129, pump hose 131 on a hydraulic driven reel 132 and loading hopper 133. Viewable on the side of truck 121 in FIG. 1A are in addition: a rotary airlock pump mechanism 135, a tractor loading bucket 137, ramp parts 139, ramp extensions 141, a power take off unit 143 for drawing power for the hydraulic systems from the truck motor and hydraulic lines that connect to the various hydraulic systems. In the embodiment of the invention disclosed herein the air compressor has its own power source; however, as will be discussed in more detail below in an alternate version the air compressor could be powered from a power take off system that uses the truck engine for power.

The tractor loader 125 is a typical small tractor loader that typically weights in the range and sized to fit on the truck as well as a loading capacity to meet the demands of the pump output. A single individual sitting in the seat of the tractor operates tractor loader 125, and in the preferred embodiment the tractor is a front loader type of tractor. When the tractor is not being used and it is on truck 121 front scoop 137 of tractor 125 is stored securely under bed 147 of truck 121. Tractor loader 125is moved off and onto truck 121 under its own power with tilt ramp sections 139 and ramp extensions 141. FIG. 2 a cross sectional view of truck 121 along line U-II of FIGS. 1A and 1B depict the structure of the of tilt ramp sections 139, ramp sections 141 and truck bed 147A configured to allow the moving of tractor 125 on or off truck 121. The entire assembled ramp 149 is depicted in FIG. 2.

One of the problems of providing for the driving a tractor onto or driving it off of a standard truck bed is the steepness required for the ramp and/or the length required to make it feasible and safe. If the ramp is too steep it creates serious safety problems and the tractor might not have sufficient power to move up the ramp. If the ramp is to long it may make using a ramp impractical to carry or strong enough to bridge the gap. The present invention makes two modifications to make it safe and feasible to drive a tractor off and onto a standard truck bed. The first modification involves lowering by six inches that portion of the standard truck bed which will carry tractor 125 from the standard height of four feet above the ground to three and half feet. In FIGS. 1A and 1B the truck bed is divided with an upper section 147 and a lower section 147A. Naturally, the bed could be lowered even more than six inches or less than six inches and this portion of the invention would still be practicable. However, in the preferred embodiment six inches appears to be best. The second modification is to start the ramp that tractor 125 will move up and down with tilt ramp section or sections 139 as part of the truck bed. As can be seen in FIG. 2 tilt ramp section 139 is formed from a portion of truck bed 147A that is beveled down. Tilt ramp section 139 starts just beyond where the wheels of tractor 125 sit when it is parked on truck bed 147A for transportation. Ramp extension or extensions 141 then can be connected to tilt ramp sections 139 to complete ramp 149. Thus, by the time tractor reaches the edge 151 of truck bed 147A it is only two feet nine inches above the ground in the embodiment depicted in FIGS. 1A and 1B.

Referring to FIG. 1A a version of the ramp is depicted in which the ramp is divided up into two sections one each for the sets of wheels on either side of tractor 125 the set on the left side 153A and the set on the right side 153B. Ramp section 139 and ramp extension 141 on the left side in FIG. 1A being used for the wheels 153A on the left side and ramp section 139 and ramp extension 141 on the right side being used for the set of wheels 153B on the right side of tractor 125. When not in use ramp the extension/extensions as the case maybe 141 can be stored under tractor 125 on the bed of the truck as depicted in FIG. 1A. As an alternative embodiment not depicted, tilt ramp section 139 could extend across the entire section of bed 147A in front of tractor 125 and ramp extension 141 could be on flat unit that connects to the entire front of the ramp section that form part of the bed of the truck if tilt ramp section 139 were to extend across the entire bed in front of the tractor as it sits on the bed of the truck.

The ramp system and lowered truck bed for carrying and moving a tractor on and off of the truck, allows the tractor to be carried on the truck. It eliminates the need for a separate trailer for carrying the tractor. The ramp system and lowered truck bed accomplish this for several reasons. It lowers the center of gravity of the weight of the tractor when being carried. It reduces the length of the ramp sections to under 5 feet. It also reduces the angle of inclination t)f the ramp to allow the tractor to be safely driven off or onto the truck bed under its own power.

Transporting the tractor on the truck instead of towing it on a trailer attached to the truck or transporting it to the job site on its own separate truck and trailer has a number of advantages. Among them it saves in trailer costs: licensing, tires, equipment, brakes, lights etc. It provides a fully self-contained unit that among other things reduces the number of persons necessary for operation. Additionally, it eliminates the need for extra storage space at a yard at night and storage of the trailer on the street at the job site during operation of the system.

Compressor 127 as depicted in the disclosed embodiment is a fairly standard type of compressor that is driven by its stand-alone gas or diesel powered supply. However, compressor 127 could receive power from a power take off system that works directly off of truck engine 123 or from a power take off operating off Of the trucks gear system. The power transfer mechanism from the engine of the transmission could be a hydraulic based system. Compressor 127 provides the flow of compressed air used by rotary air lock pump mechanism 135. As will be discussed in detail below a flow of compressed air from compressor 127 is piped by appropriate hoses to a rotary air lock mechanism, to be described in detail below, where it is used to create the stream of flowable material that is being placed. The term flowable is used to described what in fact the system can accomplish, that is to take a basically dry or reasonably dry granulate material and turn it into a flowable stream to thus allow for depositing the granulate material in a desired and often hard to reach location. Typically, these hard to reach locations are on construction sites but any other application where such material has to be moved, and precisely placed as possible. The types of granulate material can vary from sand or gravel to top soil or many other type of granulate materials.

The system described herein based on the improvements detailed above and below thus, can move various flowable materials varying from sand to gravel of ½ inch or smaller size through a hose of about two to three inches in-diameter up to five hundred feet or more away from the system and up to an elevation several hundred feet or more above the system. The advantages of the system are significant and have applications In the construction industry as well as other industries that require a means to move dry bulk flowable material. Often sand, gravel or similar dry or relatively dry flowable material have to be moved to a location that may not be accessible to a dump truck, tractor or similar device used to move dry flowable material In bulk. The system can pump the dry flowable material up several stories to fill hollow steel columns to add strength to the columns. It can pump dry flowable material across water to locations normally only accessible by boat to fill In locations that pose danger to boaters. It can be used to pump dry flowable materials on to roofs of multistory buildings that are inaccessible to most other means of moving these materials. It can be used to move dry flowable materials across methane or moisture barriers that would be damaged by trucks, tractors or other devices moving across them.

One of the significant improvements of the present invention Is the use of the trucks engine 123 to provide the power for the hydraulic systems of the present invention. This is accomplished by the addition of power take off unit 143 that connects to the trucks gear system and allows it to take power from the engine of the truck and power the hydraulic systems through lines 145. The power take off connects to the hydraulic pump that pumps hydraulic fluid to the motors that turn the hose reel, the agitator, the auger, the feed bowl and pressurizes the cylinders of the hydraulic pad adjusters. As will be discussed below In more detail the system is controlled from a control panel that sends electrical signals to a manifold of electric/hydraulic cartridge valves that release the proper amount of hydraulic fluid as the demand for the system Increases or decreases. The various hydraulic systems that the power take off system provides hydraulic power to are the mechanism that rotates the rotary feed bowl (to be discussed In detail below) and hose reel 132 that is driven by a hydraulic system. The hydraulic system can also power the auger, the agitator, the hydraulic pad adjusters and the vibrator. As mentioned above and elsewhere herein while the air compressor in the embodiment described Is powered by Its own engine It can just as easily be powered by the power take off system being described herein.

Figure 2:
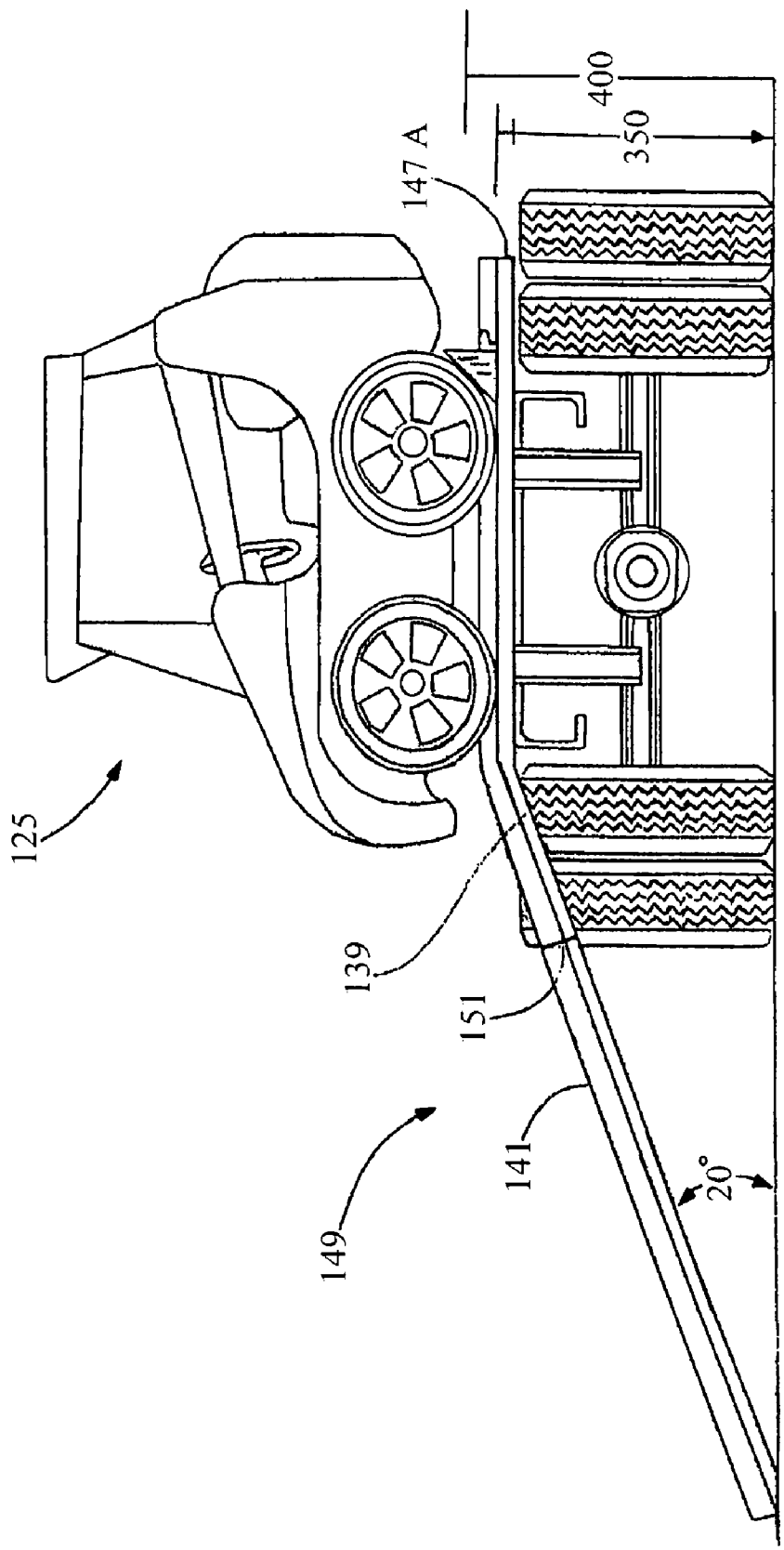
FIG. 2 is a sectional view along line IX-IX of FIGS. 1A and 1B.

FIG. 1C is a schematic block type diagram that depicts one type of power take off configuration that the present Invention could use. In the example shown the power take off provides power to the air compressor; however, it can just as easily be used to power any of the other systems of the invention. A transfer box 155 takes power from truck drive line 156, which in turn connects to the trucks transmission 157 and thereby receives power from truck engine 123. Transfer box 155 connects into the rear end of drive line 156 in a standard and well-known fashion. Transfer box 155 (also known as a split shaft power take off unit) when activated in turn transfers power from driveline 156 to the air end 158A of compressor 158. Transfer box 155 can also provide power to hydraulic pump 159. In turn hydraulic pump 159 can provide power to the various other systems such as the rotary air lock turning mechanism, the pad adjusters of the rotary air lock system, the auger, the agitator, the hose reel and any other systems needing power. Various types of power take off units could be used including those that take power off of the engine flywheel or transmission.

Consequently, the engine of the truck, provided it has sufficient horsepower, can power all of the systems of the invention at a job site. Thus, motor 123 not only is used to operate the vehicle over the highway it can be used at the job site as the power source for all of the various systems of the invention. These allows for fuel savings, noise control (the truck engine is usually much quieter than ancillary engines that would otherwise be necessary) and also results in reduction of polluting emissions into the atmosphere (the standard truck engine is designed to produce reduced emissions as compared to other stand alone engines). Additionally, it would reduce the cost of the overall system by reducing the need for one or two stand alone motors to power the system.

FIG. ID displays another option for the power take-off drive system. The compressor 158 is either mounted on a truck bed or a trailer unit. The compressor engine 158E drives air end 158A to reduce the air flow for the air pump. A hydraulic pump 160 is mounted onto the engine at a port that provides a power take-off shaft to turn the pump. The hydraulic pump 160 pumps hydraulic oil through the hydraulic lines 160L to the control panel where it is distributed to the different drive systems, the sand and gravel pumps.

Figure 3:
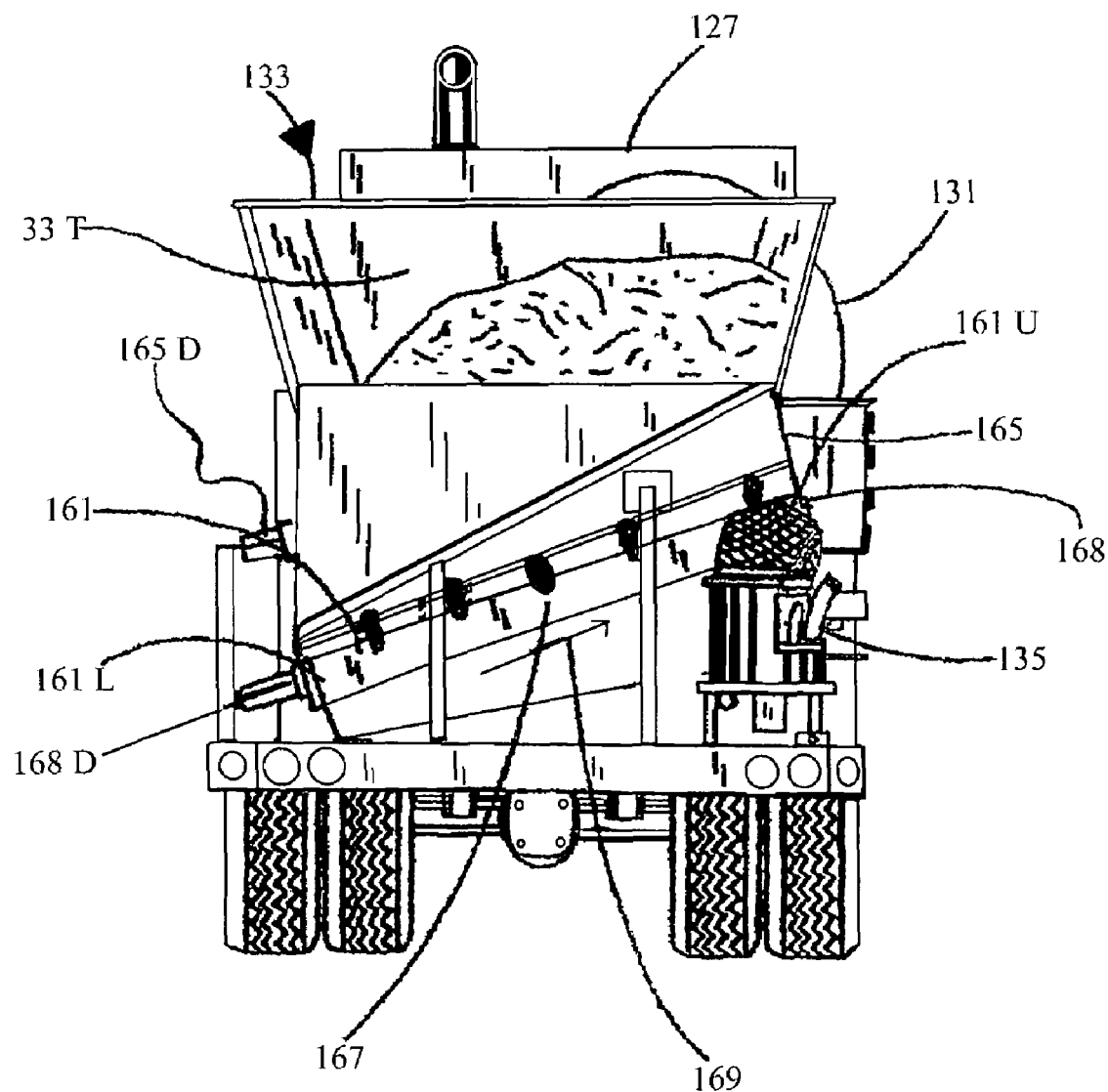
FIG. 3 a view of the rear of the improved version of the self-propelled granulate placement system.
Figure 3:
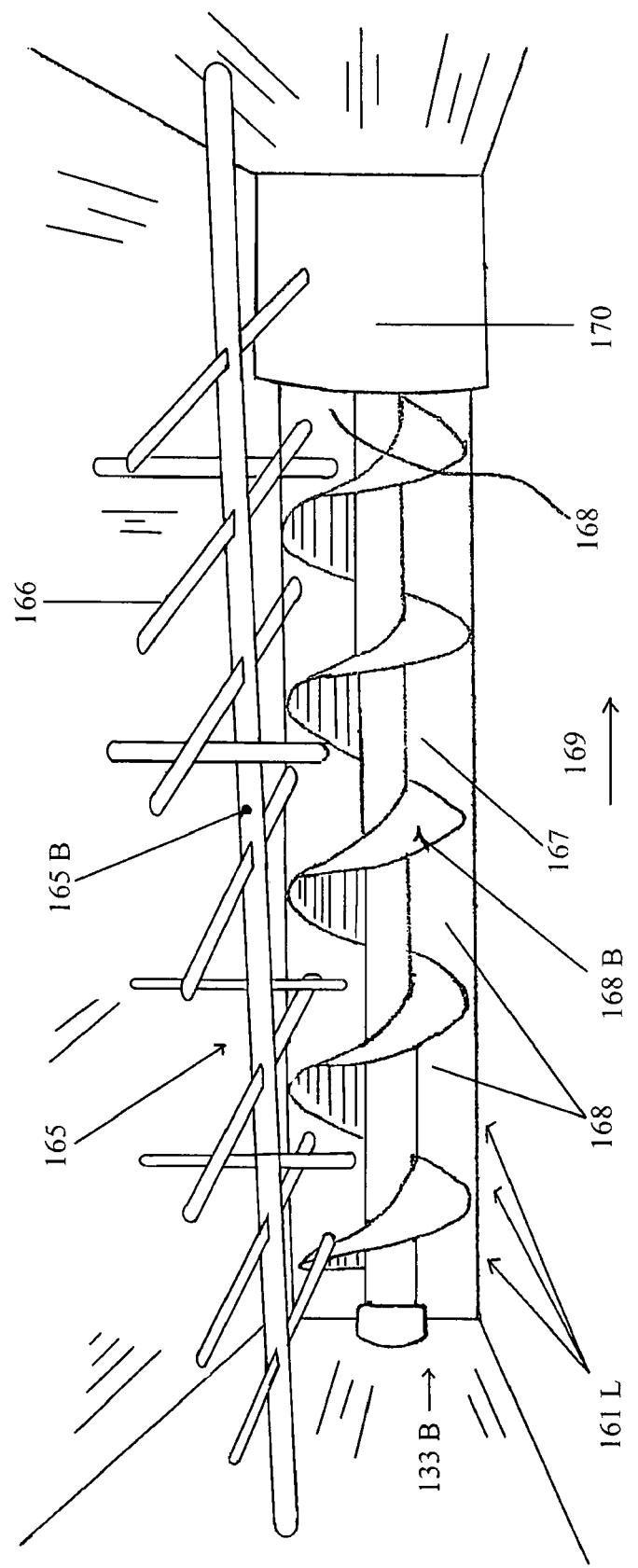
Figure 5:
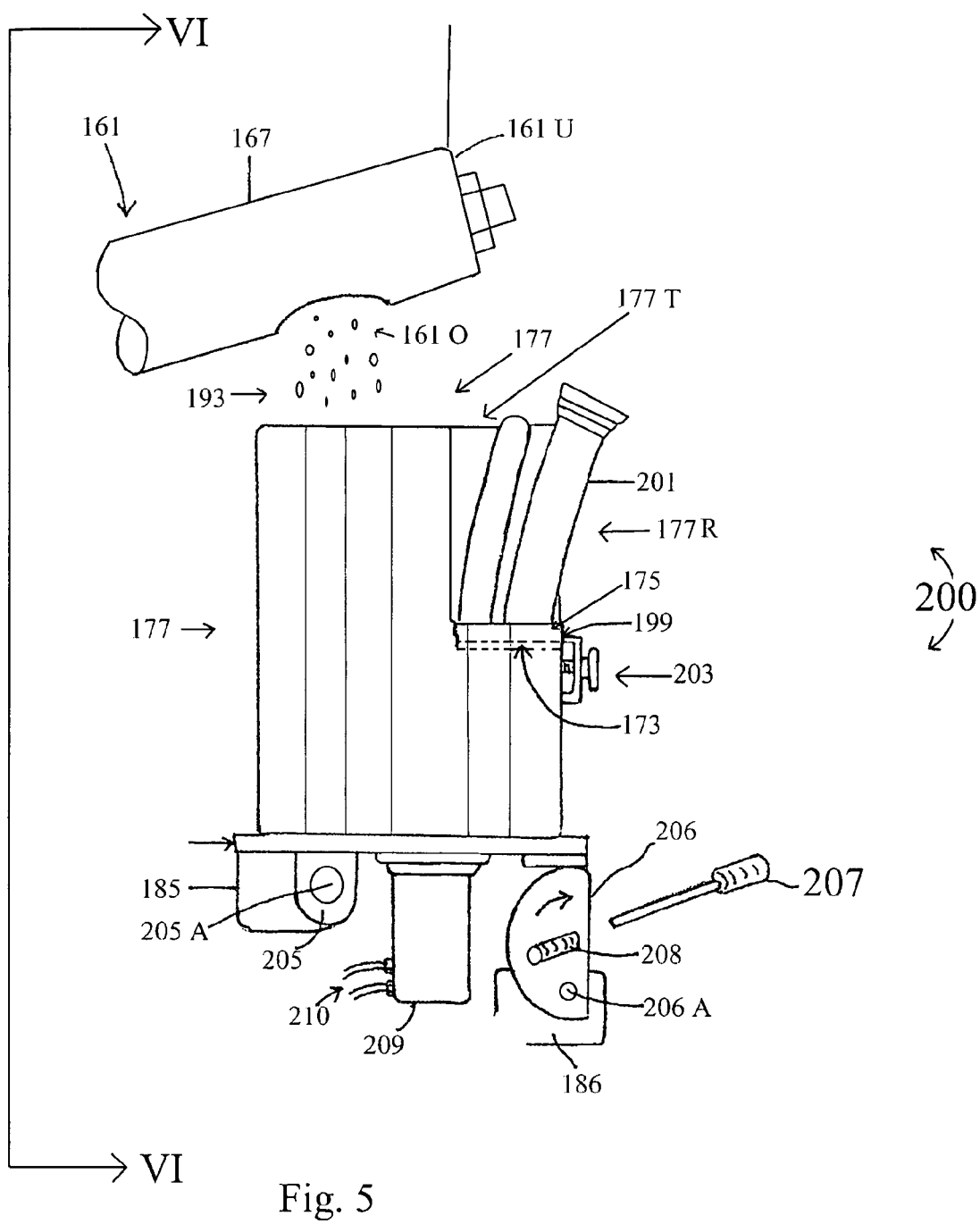
FIG. 5 a side view of a portion of an assembled rotary air lock pump system.

FIG. 3 provides a rear view of the improved version the self-propelled granulate placement system. In FIG. 3 you can see the top of air compressor 127, a portion of hydraulic hose reel 131, rotary air pump mechanism 135 loading hopper 133 and compactor drive apparatus 161. During operation of the system to place flowable material the tractor loader with bucket will deposit the material in hopper 133 which is open at its top 133T. The material falls down through hopper 133 and into a slot like opening along the tower end 161L of compactor drives apparatus 161. FIGS. 3, 3A and 5 the description provided for these figures below describe in part how this part of the system works. Compactor drive apparatus 161 in the preferred embodiment is a screw auger 168 positioned in conduit 167. The screw auger 168 is configured to turn is a direction that moves the flowable material up, as indicated by arrow 169, to an opening at the top 161U of conduit 167. The material once it reaches this point falls into rotary air lock pump system 135. Auger 168 is rotated by hydraulic drive 168D, which receives power from the hydraulic system. Agitator 165 is rotated by hydraulic drive 165D, which receives power from the hydraulic system.

FIG. 3A is a top down view of loading hopper 133. The bottom end 133B of loading hopper 133 forms a slot like opening 163 over lower end 161L of the compactor drive apparatus. Within the slot like opening into conduit 167 a portion of auger 168 can be seen. The granulate material when it is deposited in hopper 133 it falls to the bottom of hopper 133 and in through opining 63. Auger 168 which rotates during operation of the system moves the material in the direction of arrow 169, as discussed above. The top end of slot 163 is covered with plate shroud 170 to prevent granulate material from causing, as will be discussed in detail below, an excessive build up at the top end of auger 168 and discharging prematurely into the pumping device and overloading and flooding the collection barrel. The system includes an agitator 165 with spokes 166 spaced out along shaft 165S of agitator 165. Agitator 165 turns during operation of the auger when aggregate or granulate is placed in hopper 133. As can be seen in FIG. 3A agitator 165 is designed to prevent bridging of the granulate or aggregate material deposited in hopper 133. Referring back to FIG. 3 the end of auger 168 with its drive mechanism 168D can be seen. Additionally the end of agitator 165 and its drive mechanism 165D can be seen. In the preferred embodiment both drives mechanisms receive their power from the hydraulic system in the standard manner.

Figure 4:
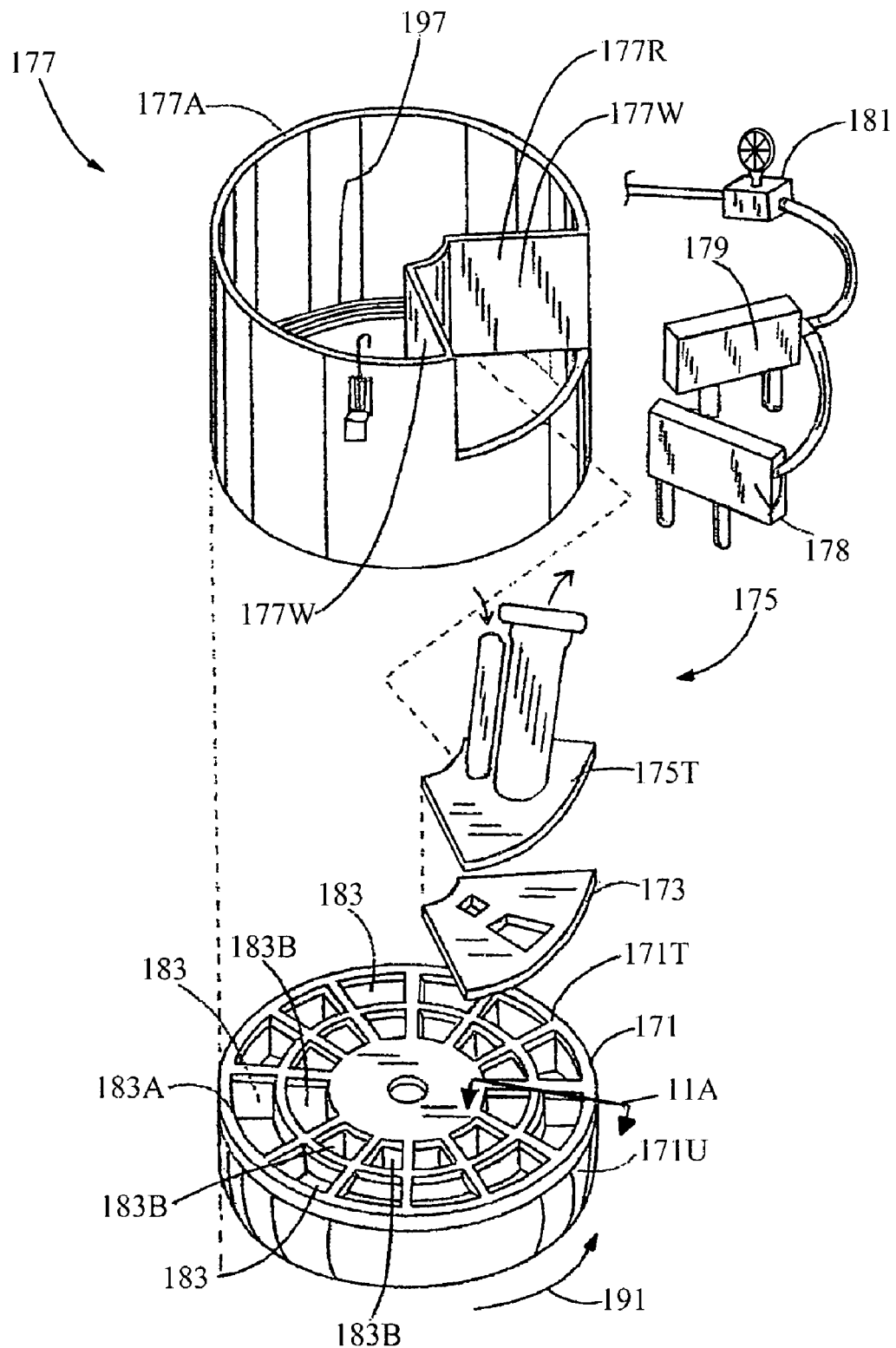
FIG. 4 schematic blow-up view of the major functional components of the rotary air lock pump mechanism.
Figure 4:
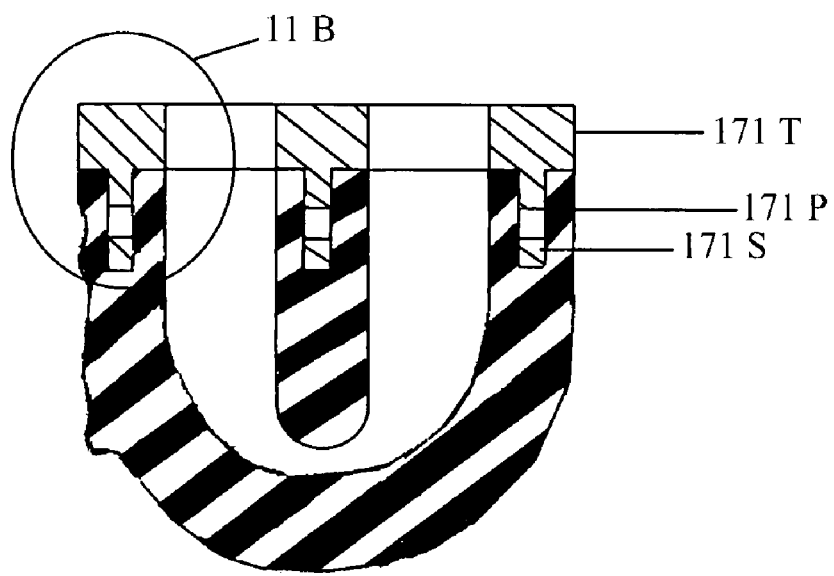
Figure 4:
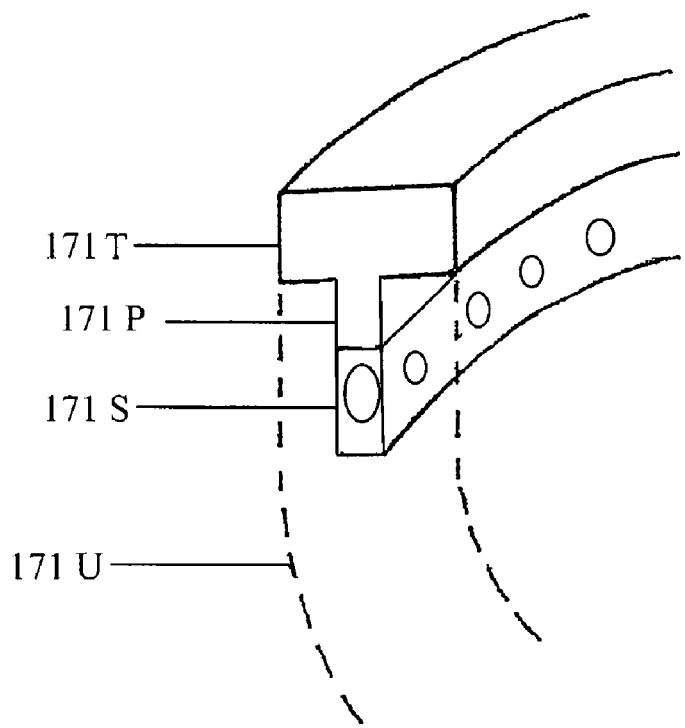

FIG. 4 provides a schematic blow up view of the rotary air lock pump system and the major functional components of the rotary air lock pump system. The system consists of a material feed bowl 171, a wear pad 173, an air intake and material ejection manifold 175, a material collection barrel 177, a double piston cylinder 178, a double piston cylinder piston 179 and an adjustable hydraulic pressure gauge 181. Material feed bowl 171 has a series of chambers 183 and each chamber 183 has two openings 183A and 183B.

When assembled for operation the top edge of material feed bowl 171 is positioned partly inside the lower edge of material collection barrel 177. Wear pad 173 rests on top of material feed bowl positioned in receiving recess 177R of material collection barrel 177. Air intake and material ejection manifold sits on top of wear pad 173. Pistons 178 and on 179 in the preferred embodiment are attached to the side walls 177W that form receiving recess 177R of material collection barrel 177. Pistons 178 and 179 apply uniform pressure to the topside of base plate 175T of manifold 175. Application of uniform pressure to base plate promotes an even wear of wear pad 173 and prevents the development of leaks at the seal of wear pad and the top of bowl 171. In operation bowl 171 rotates in a counter clockwise direction as indicated by arrow 191 while material collection barrel 177, wear pad 173, manifold 175 and pistons 178 and 179 are held in place, in the preferred embodiment pistons 178 and 179 are driven by the systems hydraulic system, which in turn is powered by the trucks engine through the power take off unit as discussed above. Pressure in pistons 178 and 179 is controlled by adjustable hydraulic pressure regulator 181 with pressure gauge 181a. Prior to the innovation of using pistons 178 and 179 to maintain constant pressure on manifold 175 and wear pad 173 the system operator had to make manual adjustments to the manifold 175 wear pad 173 with a clamping type system. Given the highly abrasive material the system was handling, sand, gravel, etc., wear pad 173 could easily get out of proper alignment and it would prematurely wear and leaks would develop requiring constant maintenance and replacement of wear pad 173 on a hourly basis during operation. Use of the piston arrangement to provide a system that can deliver constant and even pressure over the entire manifold 175 base plate 175T and wear pad 173 solves this problem. Wear pad 173 thus in many respects acts as a wear gasket. As noted above and discussed in detail below the air injected into the chambers 183 of the material feed bowl 171 to eject the aggregate material deposited in the chambers is cooled to at least close to ambient air temperature. Cooling the air eliminates a lot of problems with operation of the rotary air lock system and prolongs its operation without the need for maintenance.

Wear pad 173 in the preferred embodiment is made of a thick and durable rubber material that when used under constant pressure can withstand a significant amount of wear before being replaced. Side walls 177W of material collection barrel have projections that come down to a point adjacent to the sides of wear pad 173 just above bowl 171 and help hold wear pad 173 in place.

In its preferred embodiment material collection bowl is made of a polyurethane lower part 171U to reduce wear and prevent material from sticking to a hot bowl. Wear template 171T connects to lower part 171U to complete bowl 171. Wear template 171T is that portion of bowl 171 that makes contact with the rest of the system when in operation. Thus, wear template 171T during operation is constantly rubbing against the lower side of wear gasket or pad 173. Given the extensive amount of abrasion wear template experiences during operation it has been found that metal, in particularly steel is a preferred material, although other materials both metals and non metals could be used. However, one of the drawbacks of using metal for wear template 171T is the amount of heat it generates and transmits to the rest of the bowl. This has resulted in breaking the standard adhesive bond between wear template 171T and lower bowl portion 171U. Once the bond breaks down between template 171T and bowl 171U leaks of material develop at the bond area. This problem has been solved by employing an interleaving type of connection 171 S (FIGS. 4A and 4B) between bowl section 171U and wear template 171T to prevent leakage developing during use. One interleaving technique is to use a tongue and groove connection as depicted in FIG. 4A which depicts a cross sectional area with wear template 171T and bowl portion 171U. As can be seen a portion 171P of wear plate 171T projects down into bowl portion 171U. FIGS. 4A and 4B show the preferred method of the present invention of connecting steel wear template 171T to urethane bowl 171U. 171P is a solid key weld to wear template 171T. 171S is a screened interleaving steel mesh welded connection that allows the molded urethane bowl to cling to and interweave around 171S. This creates a very tight bond that eliminates the problem of delamination of bowl 171U from wear template 171T if the bowl and wear template become to hot from friction. Also, as can be seen in FIG. 4 wear template 171T sits on the top edge of bowl 171 and frames openings 183A and 183B of chambers 183 of bowl 171.

FIG. 5 provides a side view of the assembled rotary air lock mechanism. Upper end 161U of compactor drive apparatus is positioned above the rotary air lock mechanism. When fully assembled collection barrel 177 surrounds the material collection bowl Collection barrel 177 sits on pivoting base plate 184. Pivoting base plate 184 connects to support member 185 of the body of truck that carries the system. The truck is described above and depicted in several of the Figs. Pivot member 205 rigidly connects to base plate 184 but is pivotally and detachably connected by hinge assembly member 205A to support member 185. Cam 206 is pivotally and detachably connected to truck support member 186 at the pivot point by hinge assembly member 206A. Thus, when hand lever 207 is inserted in sleeve pocket 208 and pushed in a downward motion cam lever 206 pivots on 206A allowing the entire pump unit 200 to tilt on hinge assembly 205A. This tilted position allows for cleaning and maintenance of the unit. Additionally, by removing both hinge assemblies 205A and 206A the entire rotary air lock assembly 207 can be removed for maintenance or replacement. Use of the hinges cams and levers allows for ease of maintenance. As will be discussed in more detail below there a number of other innovations in the present invention, that facilitate repair and maintenance of the system including a reversible adjustable wear collar at the interior junction of the collection barrel and material feed bowl, the hydraulic automatic pressurized pad adjusters, etc. as discussed herein.

Hydraulic drive 209 rotates the material feed bowl, which is not shown in FIG. 5 since it is covered by collection barrel 177. Hydraulic drive 209 Is driven by hydraulic fluid from lines 210. Lines 210 connect to the hydraulic power unit described elsewhere in this specification. Most systems that use a rotary air lock pumps rotate the material feed bowl with a chain driven mechanism or geared mechanism running directly off an air driven motor. The air driven systems are extremely noisy, inefficient and require filtering of the air to remove dust and grease. The ones driven by a geared mechanism require at least five gears with their bearings and chains or belts. This increases the complexity of the system and making it to some extent inefficient and subject to a high rate of failure. By using a hydraulic driven system all of the problems of air and gear driven systems are eliminated. Only one gear and bearing is required for rotation of the system and that can be sealed within the hydraulic system. Use of the hydraulic drive also eliminates most of the noise and the speed of rotation can be easily controlled by the flow of hydraulic fluid eliminating the need for gears of various ratios. Use of hydraulic motors, pumps and valves to control and power of most if not all of the systems results in costs savings and a significant reduction in noise and dust created by conventional systems that use noisy air driven motors, chains and gear drives.

Figure 6:
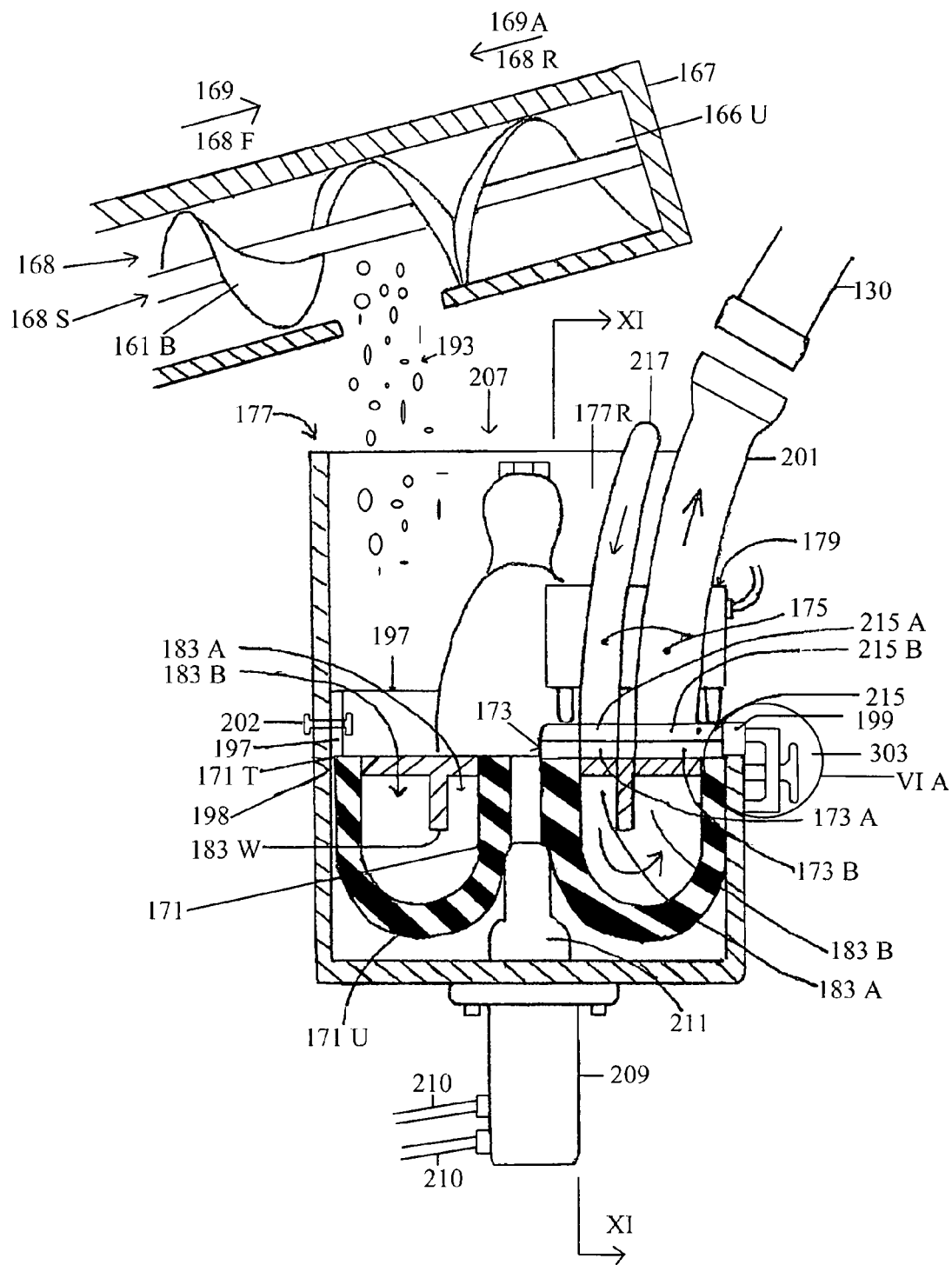
FIG. 6a is a close up view of the items in circle VIA of FIG. 6.

Sticking out of receiving recess 177R is material ejection conduit 201 of manifold 175. Clamp 203 holds exterior blow out seal 199 along the juncture of manifold 175, wear pad 173 and the top of material collection bowl 171T. Exterior blow out seal pad 199 prevents the inadvertent escape of aggregate or granulate material at the juncture of bowl 171, wear pad 173 and conduit 201. FIG. 5A provides a front view of exterior blow out seal pad 199, which in the preferred embodiment of the invention is made of a substantially dense but flexible, rugged and moldable rubber or similar material. FIG. 5B is a perspective view of blow out seal pad 173. As can best be appreciated by also viewing FIGS. 6, 6A, and 7 in conjunction with one another, the pad 199 defines a recess 199a (seen in FIG. 5B) into which an arcuate support strip 199b is received, as is seen in FIG. 6A. The pad 199 is a wearing part that is easily replaced on the durable metallic support strip 199b. The pad 199 and strip 199b form a tongue-and-groove interconnection, as is best seen also in FIG. 6A. Accordingly, it will be understood that the pad 199 is not permanently attached to the strip 199b, and may be easily replaced with a new pad when it becomes worn.

Referring to FIG. 5 again, during operation the flowable material 193 that consists of a stream of aggregate or granular, material described in more detail elsewhere in this specification, is being ejected out of upper end 161U of compactor drive apparatus 161. The material 193 fails out through opening 161O into top 177T open end of material collection barrel 177. Only exterior of conduit 167 is visible in FIG. 5. However, referring to FIG. 6 a cross-sectional view along plane VI-VI of FIG. 5 of conduit 167 and rotary air lock pump assembly 207 is presented.

FIG. 6 as noted is a cross sectional view of rotary air pump assembly 207 in FIG. 5 along plane VI-VI. Barrel 177 with a portion of recess 177R can be seen. Cross sections of two of the chambers 183 of bowl 171 can be seen. Also the two openings, namely the first 183A and 183B are shown in cross section. Additionally, wall 183W that separates openings 183A and 183B can be clearly seen in FIG. 6. Wear pad or gasket 173 also appears in cross section under manifold 175 that is positioned above wear gasket 173. Base plate 215 of manifold 175 abuts on its bottom side wear gasket 173. Base plate 215 as well as gasket 173 have two openings that are congruent with openings 183A and 183B as each chamber is presented to manifold 173 by rotation of bowl 171. Opening 215A of base plate 215 and opening 173A of gasket or pad 173 are congruent with opening 183A of the chamber 183 located below gasket 173. Likewise, opening 215B of base plate 215 and opening 173B of gasket or pad 173 are congruent with opening 183B of the chamber 183 located below gasket 173. Manifold 175 includes an air inlet conduit 217 as well as material ejection conduit 201. Air inlet conduit connects to the topside of base plate at opening 215A and material ejection conduit 201 connects to base plate 215 at the topside of opening 215B.

Reversible wear collar 197 is attached to the inside of barrel 177 just above material feed bowl 171. In fact the bottom edge of reversible wear collar 197 during operation of the rotary air pump just touches the top outside edge 171T of material feed bowl 171 at friction point 198. Wear collar 197 is attached by detachable connecting elements 202. In the preferred embodiment detachable connection elements 202 are standard bolts and nuts with washers. Wear collar 197 only extends around the inside periphery of barrel 177 outside of receiving recess 177R. Wear collar 197 is made of durable hard but flexible rubber in the preferred embodiment.

Use of the reversible adjustable wear collar between the collection barrel and the bowl prevents dust from leaking from between the junction of the collection barrel and the material feed bowl. The pressure is higher in the collection barrel and the material feed bowl but the sealing effect of the wear collar prevents the escape of dust into the atmosphere around the barrel and bowl. This makes it safer for the operator. Prior art systems used felt which would blow out. As noted above the adjustable wear collar can be adjusted up and down, reversible inside out or reversible from top to bottom to assure an good sealing effect and maximize its use.

A cross-sectional view of the upper portion 161U of auger conduit 167 and auger 168 reveals the flighting of auger 168. The flighting of the auger is the continuous spiral blade 168B of auger 168 that spirals around shaft 168S of auger 168. Depending on the orientation of the flighting and the direction the shaft rotates material deposited in conduit 167 on to auger 168 will move in one direction or the other. In FIG. 6 the flighting of auger 168 is configured in two different orientations. The first orientation 168F is designed to move material in the direction of arrow 169 and the second 168R is designed to move material in the direction of arrow 169A when the auger shaft is rotated in the appropriate and preferred direction. Reversing of the flighting of auger 168 at its top end solves a serious problem. Normally, without the reverse flighting material 193 moving up conduit 167 with auger 168 would have a tendency to compact at the end 161U of auger conduit 167. A detailed description of the auger flighting is not provided herein because once one of ordinary skill in the art reads and understands this specification they should have no problem in determining the appropriate orientation of the forward and reverse flighting to achieve the appropriate effect.

Figure 1D:
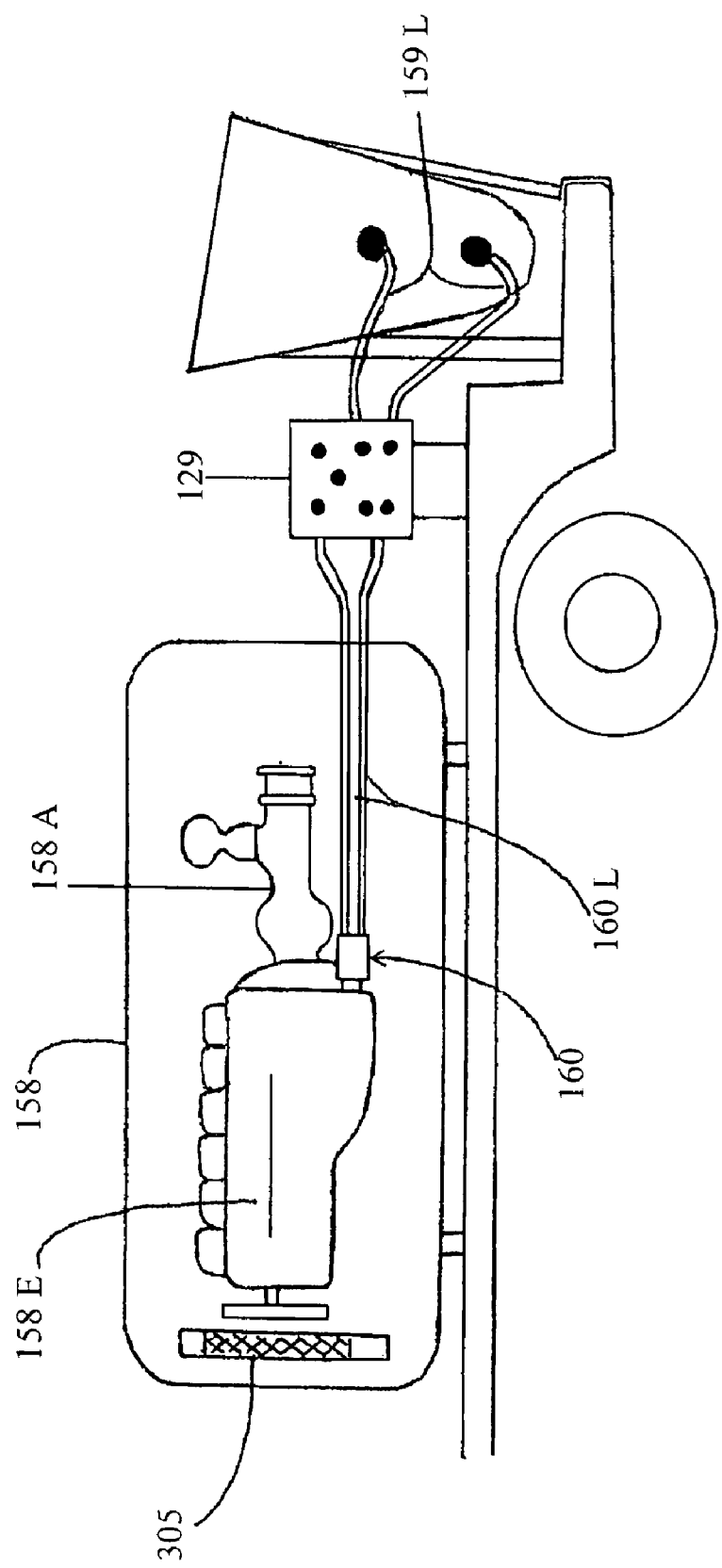
FIG. 1D is a schematic diagram of another version of a power take off system for use with the present invention.

The system works such that flowable material is introduced into barrel 177 by compactor drive apparatus 161. The flowable material then falls into the open exposed chambers 183B of bowl 171. While the flowable material is being deposited in barrel 177 bowl 171 is rotating under power from hydraulic drive 209. Hydraulic drive 209 is receiving power from the power take off unit, shown in other figures, through appropriate hydraulic lines 210 that appear in part in FIG. 6. Hydraulic drive 209 delivers its power through drive shaft 211 that connects to the bottom of bowl 171. In turn as bowl 171 rotates each chamber is presented to manifold 175 so that high-pressure air from the air compressor (127 FIG. 1) by an appropriate hose hookup to conduit 217 is introduced into the chamber 183 that is at that moment located below manifold 175. The high-pressure air is introduced through opening 183A of the chamber 183. This high-pressure air then forces material located in chamber 183 located below manifold 175 out through material ejection conduit 201. During operation pump hose 130, which can be up to several hundred feet long, is attached to the end of conduit 201 and is used to place the stream of flowable material generated by rotary air lock mechanism 207. Pump hose 130 having been taken off reel 131 (FIGS. 1A and 1B) where it is stored when in transit or not in use. The end of pump hose 130 opposite the end connected to conduit 201 is taken out to the place where the flowable material will placed and the stream of material is then deposited. As noted, given the efficiencies of the system the flowable material can be moved up to several hundred feet from the truck.

Figure 7:
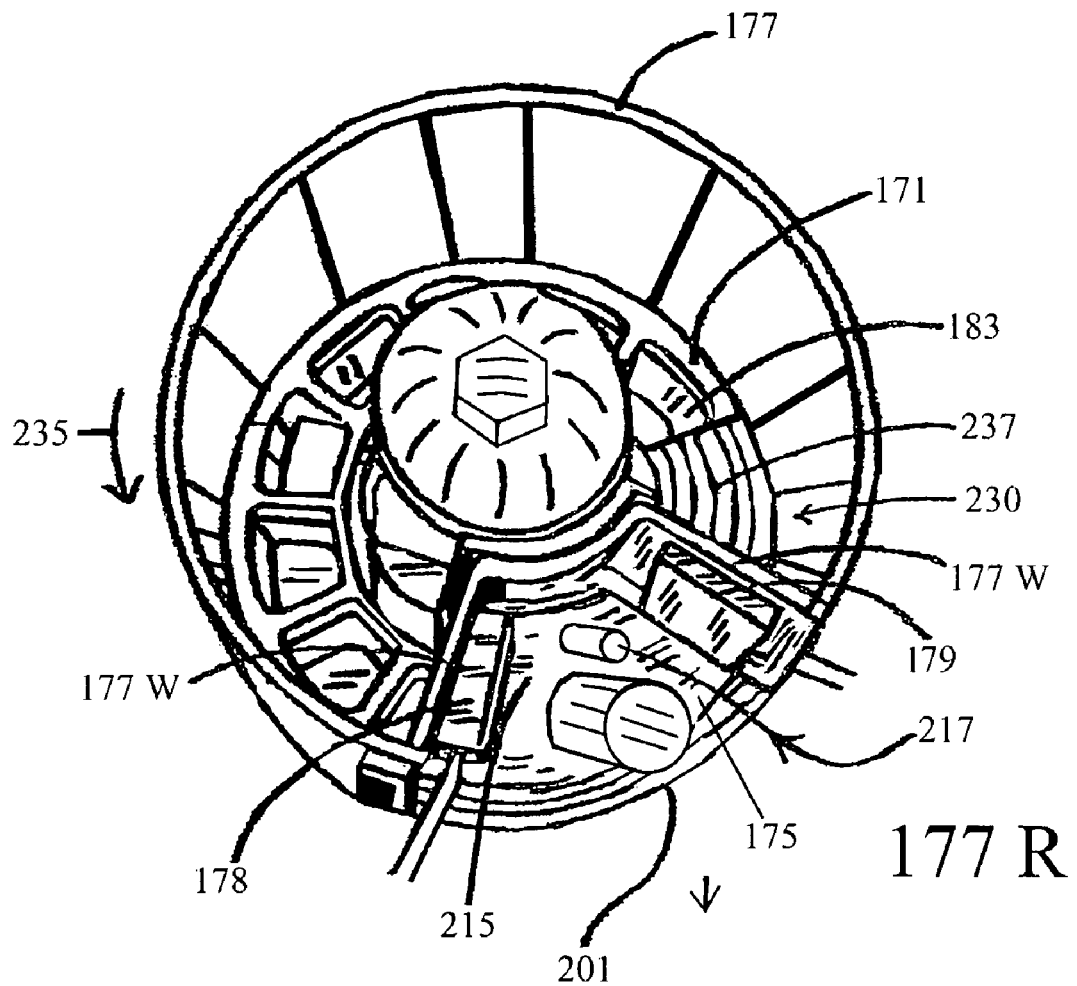
FIG. 7 a top view of a portion of a rotary air lock pump system.
Figure 7:

FIG. 7 is atop down view of part of the rotary air pump assembly. Barrel 177, barrel receiving recess 177R and recess wall 177W are visible. Manifold 175 is connected and air introduction conduit 217 and material ejection conduit 201 are present. Also, the tops of piston 178 and 179 are visible although the hydraulic lines are not shown. In the preferred embodiment bowl 171 rotates in a counterclockwise direction as indicated by arrow 235. One of the problems experienced in operation was seepage of flowable material out of the chambers as they passed beyond recess 177R at position 230 in FIG. 7. To solve this problem deflector 237 was added. Deflector 237 is positioned adjacent to the outside of the wall of recess 177R and covers the chambers as they leave the cover of manifold 175. Deflector 237 prevents the flowable material from being blown out of the chambers by any residual high pressure air left in the chambers as they pass beyond recess 177R in their counterclockwise movement in the direction of arrow 235. FIG. 7A provides a perspective view of deflector 237. Deflector 237 in its preferred embodiment is a hard but flexible rubber wedge that connects to the wall of recess 177R by means of plate 239.

Figure 8:
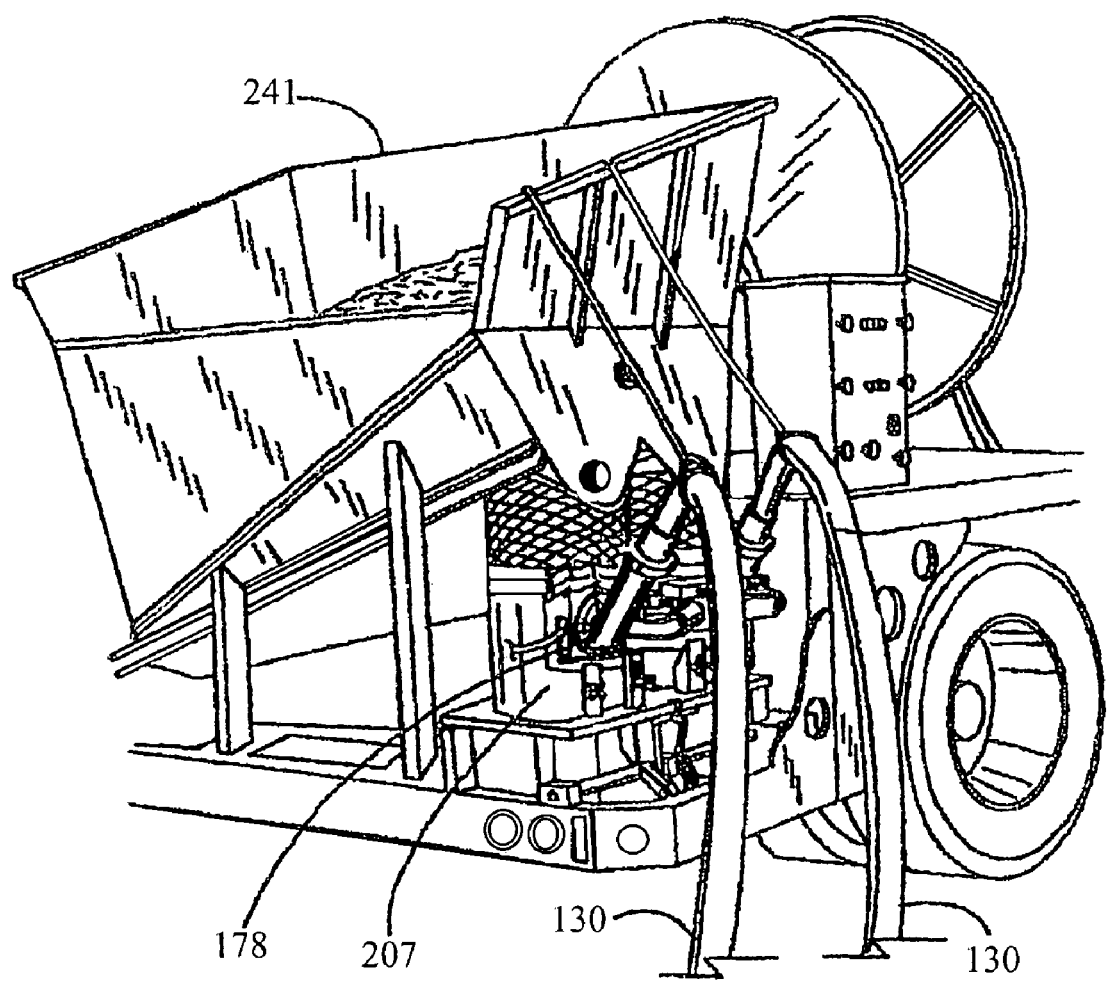
FIG. 8 is rear perspective view of a system of the present invention with two rotary air lock pumps.

FIG. 8 provides a view of the rear of a version of the invention that has two rotary air lock mechanisms 207. To each of rotary air lock mechanism a pump hose has been attached 130. Additionally, each rotary air lock pump 207 would have a separate compactor drive apparatus not shown but located at the bottom of dual hopper 241 to provide the flow of material from hopper 241.

Figure 9:
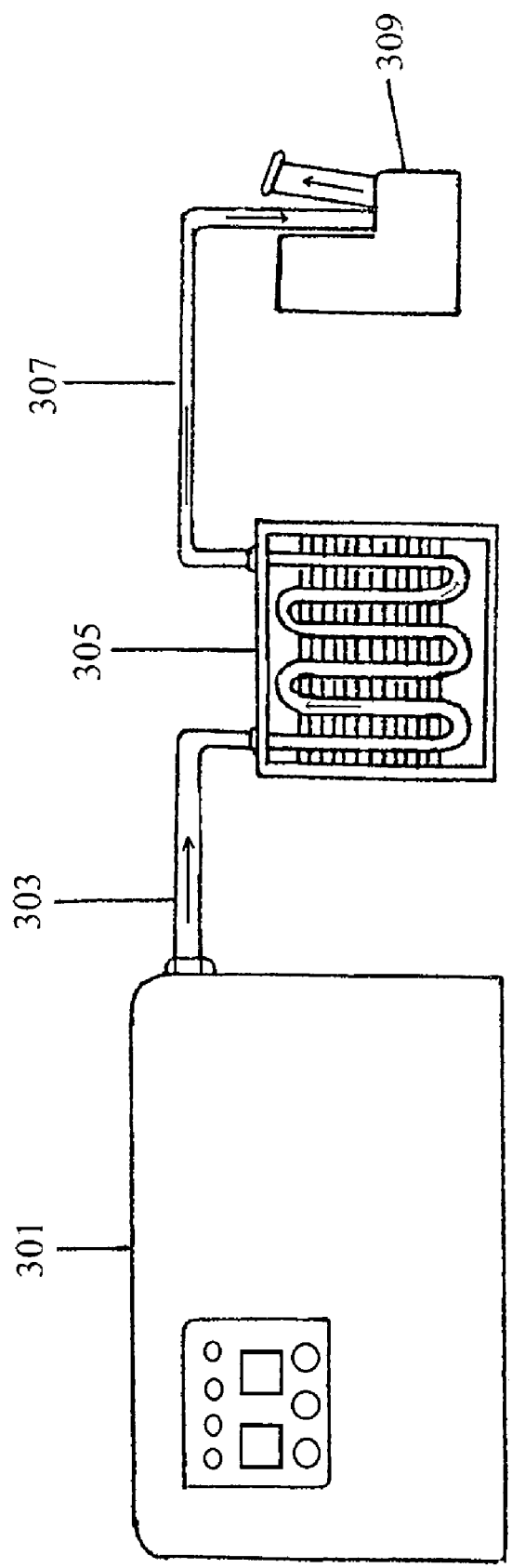
FIG. 9 is schematic block diagram of the system used to cool the pressurized air used to eject material from the rotary air lock mechanism.

The system in its preferred embodiment as mentioned above cools the air being used to eject material from the chambers of the feed bowl after it leaves the air compressor and just before it is injected into the chambers of the material feed bowl. FIG. 9 is a schematic block diagram of the air-cooling setup. Air from compressor 301 moves through line 303 to air cooling unit 305 and from there is sent by line 307 to rotary air lock pump 309. Upon reaching rotary air lock pump 309, as described above in more detail, the air is injected into the receiving opening of the chambers of the rotary air lock material feed bowl. This as noted above causes the material deposited in the chambers to be ejected out of the ejection conduit to form the stream of material being deposited. Typically, if the air was not cooled before it entered the chambers of the rotary air lock it would be at a temperature of at least 180° F. to 200° F. At these temperatures the air entering the chamber causes steel wear template 171T heat up, warp and separate from the rest of material feed bowl 171.

Additionally, the high temperatures causes rubber wear pad 173 to quickly wear as well as leaks to develop in the seals around the area where air intake and material ejection manifold meet rubber wear pad 173. Additionally, the hot air causes the material to adhere to the sides of the bowl.

The cooling system depicted in FIG. 9 can typically cool the air to at least 10° to 20° above ambient air temperature. This results in a tremendous improvement in the operation of the system as well as substantially extending the use life of the parts of the system. By cooling the air entering the rotary air lock from 180° F. to 200° F. to 80° F. or less the entire system runs much cooler and will not become so over heated as to pose a threat to the safety of those operating it. Thus, by cooling air as it comes from the air compressor just before it enters the rotary air lock pump it results in a tremendous reduction in frictional forces and wear and tear on the wear pads, the wear template of the bowl and the other parts of the rotary air lock pump.

Figure 10:
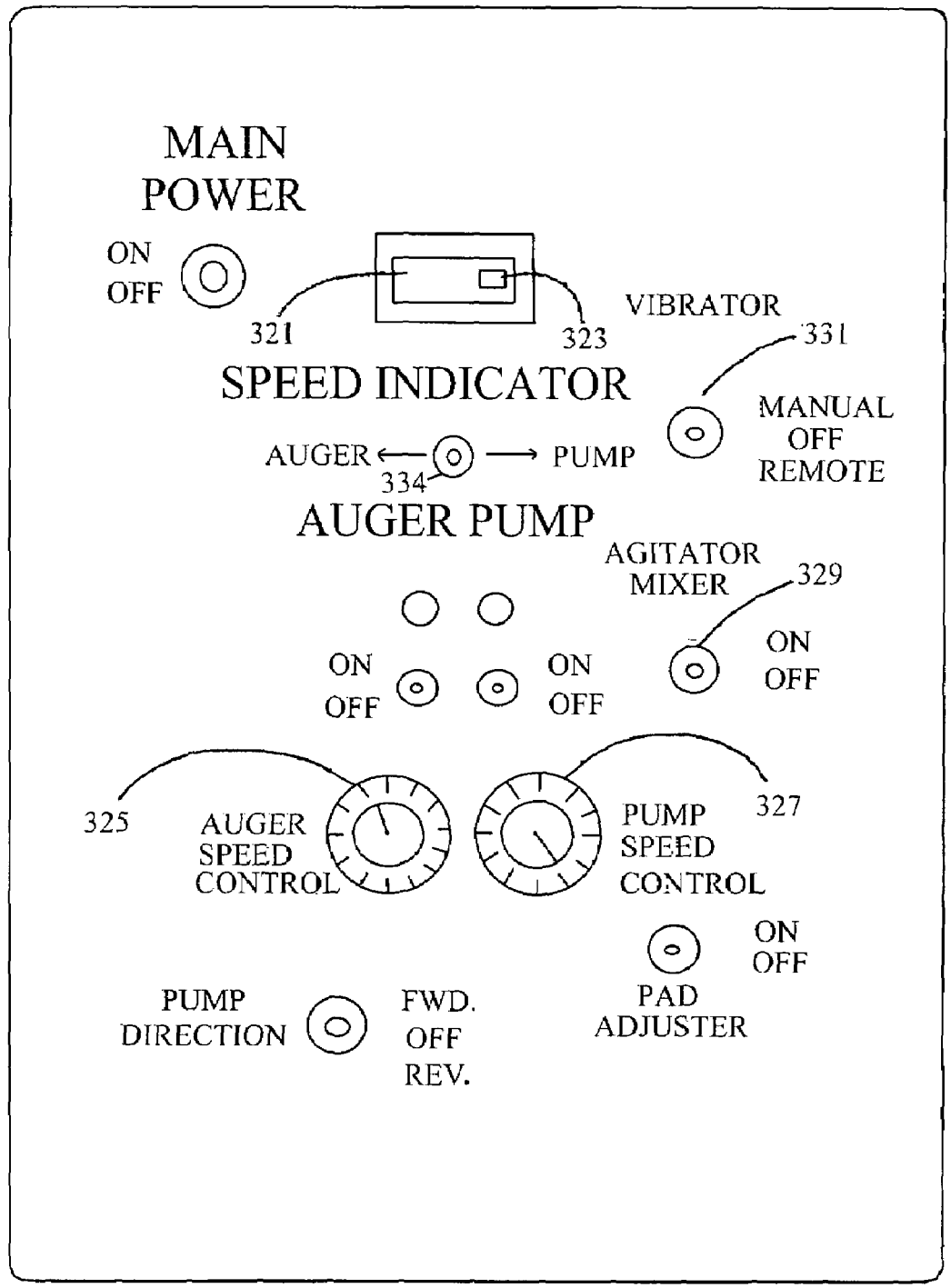
FIG. 10 is a frontal view of a control panel of a preferred embodiment of the present invention.

A front view of a control panel of the preferred embodiment of the present invention is provided in FIG. 10. The basic control panel will have a speed indicator in RPM's for the auger 321 and the rotary air lock bowl 323. Also, it will have an auger speed control 325 and a rotary air lock bowl speed control 327 as well as operation controls for the agitator 329 and vibrator 331. The speed indictors shown present the RPM's in digital format. However, appropriate analog dials can work. Additionally, only one speed indicator could be used with a switch 334 to change between an auger speed-reading mode and rotary airlock speed-reading mode.

In order to have the system operate at optimal efficiency the speed in RPM's of the auger and rotary air lock must be coordinated. Thus, when the system is started adjustments must be made to the speed of the auger and the rotary air lock to assure the auger is providing an appropriate flow of material to the material feed barrel but not to much so that it clogs with more than it can handle given the speed of the rotary air lock. Additionally, by varying the speed of the auger and the rotary air lock one can control the quantity or amount of material flowing through the pipe placing the material. This will allow for use of flexible hose to place the material of different size. In practice hose of between two to three Inches has been found to be quite efficient.

In controlling the RPM's of the auger and rotary air lock one merely has to turn dials 325 and 327 respectively to achieve the desired operation. Operation of the agitator in the receiving hopper Is controlled by dial 329. Since the actual speed of the agitator is not as crucial as the auger or rotary air lock there is no need to provide a speed indicator. Operation of the vibrator is controlled by dial 331.

Figure 11:
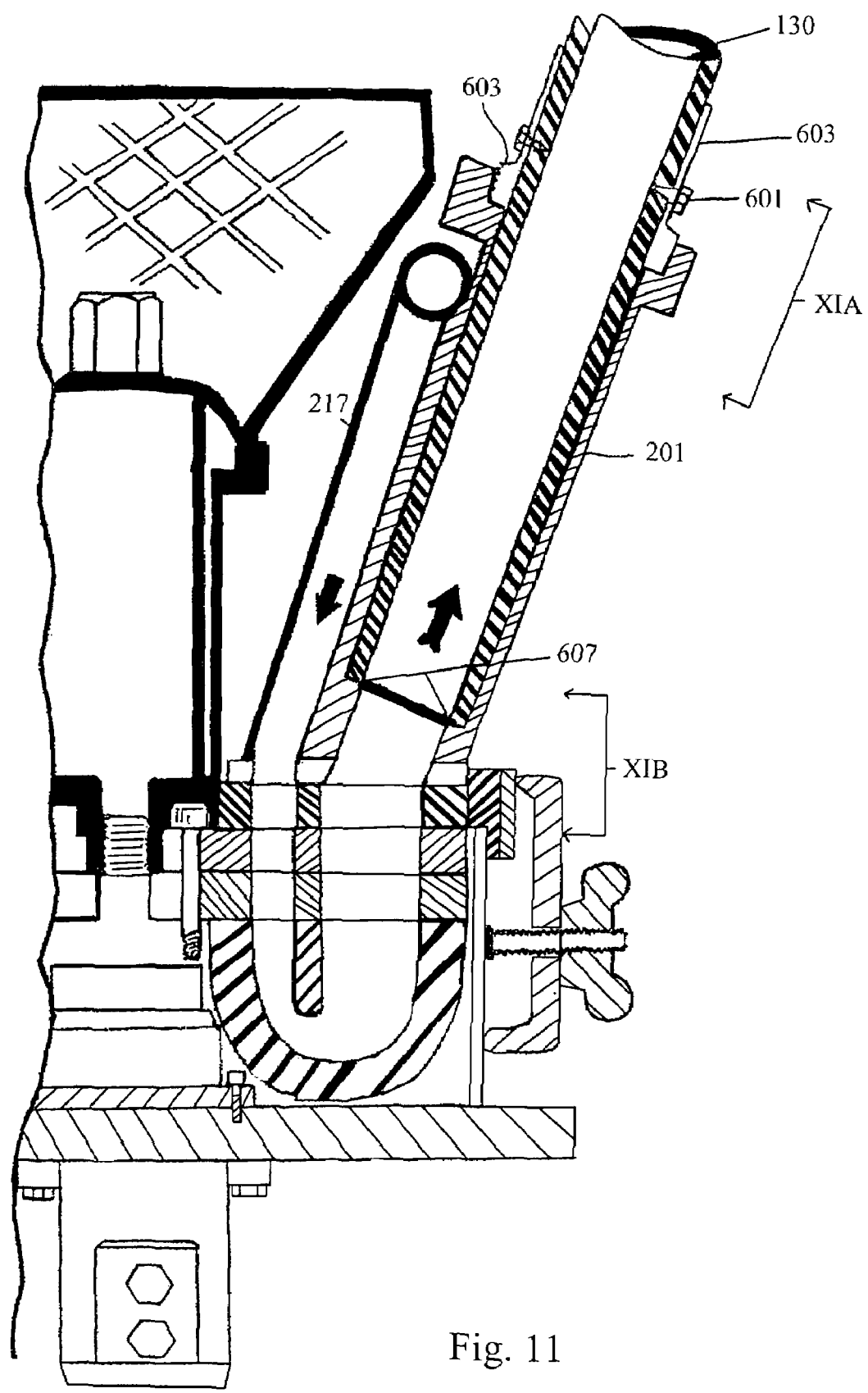
FIG. 11 is a cross-sectional view of the material ejection manifold along XI-XI in FIG. 6.
Figure 11:
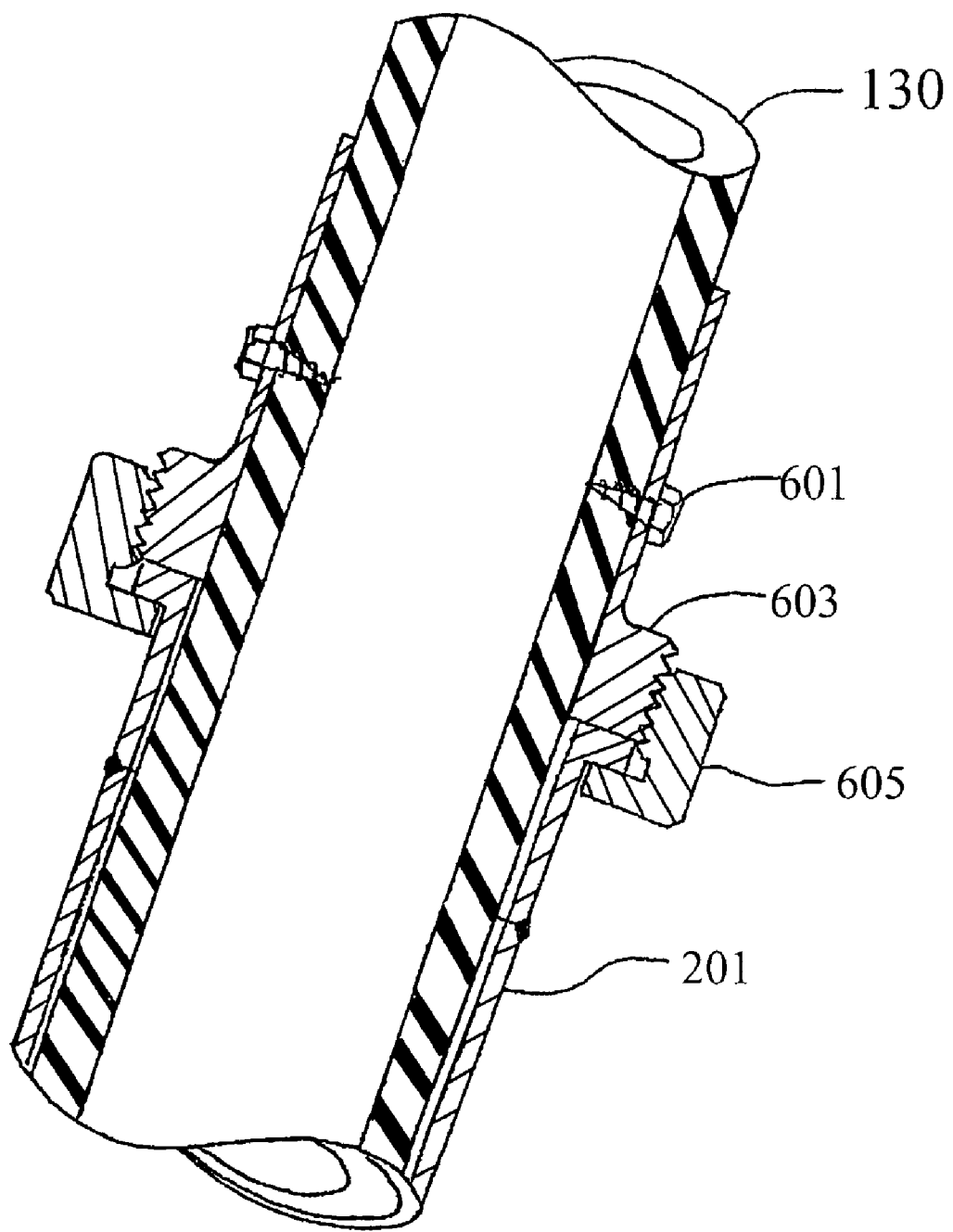
Figure 11:
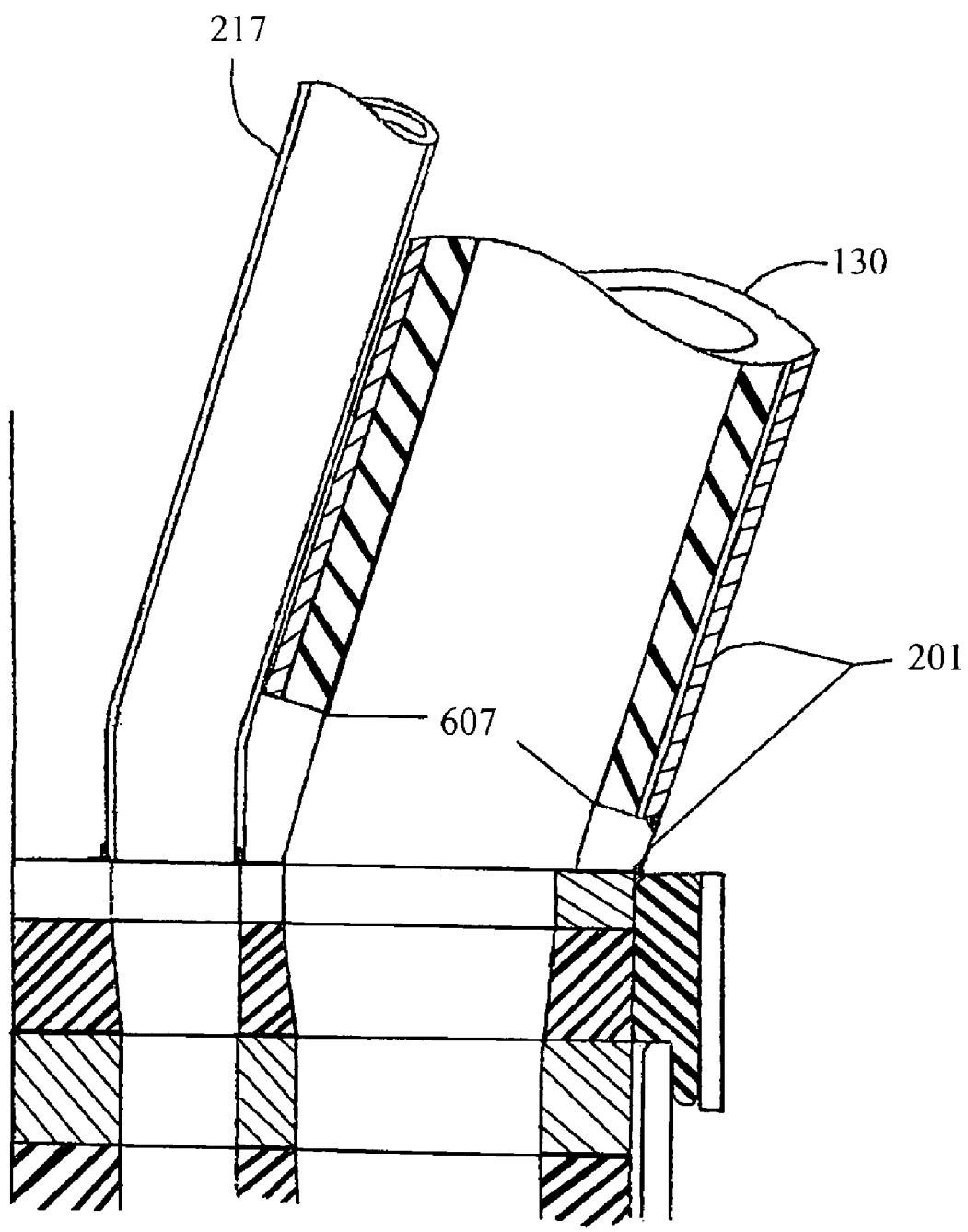

FIG. 11, FIG. 11A, and FIG. 11B depict a more detailed fragmentary view in side elevation and partially in cross section of the bowl, manifold, and barrel, and particularly illustrates an improved connection of the material hose 130 to the exhaust manifold 201, Previous models were designed to have approximately a 45° angle exhaust pipe attached to the manifold. This configuration was required due to the location of the mechanism and the need to adjust the wear pads. Because the hydraulic pad adjuster system is used it relieves congestion directly around the manifold, and thus allowing for a more direct flow of air coming into the manifold, and for exit of material out of the manifold. The elimination of the extreme 45° angle, and reducing it to 15° angle has significant effects. The previous design with the 45° angle experienced extreme wear in the exhaust pipe due to the ricochet effect of material caused by the restricted configuration of the system at that time. The new design, with approximately a 20° or less angle allows for a more unrestricted flow of material entering and exiting.

Additionally there is an improved hose to manifold connection as depicted in FIGS. 11, 11A, and 11B. instead of having the beginning of the hose start at the furthest exit point of the manifold 201, the new and improved systems calls for an insertion of rubber hose 130, inside the manifold pipe 201, creating a seal 607, where it joins at the inner point of the manifold. The hose 130 creates a wearable replacement liner-within the steel manifold 201, The hose clamp 603 is attached to the hose 130 with screws 601 at a point that matches the end point of the manifold 201. A collar 605 secures the connection. Consequently as the hose 130 wears m, steel manifold 201, the operator simply removes the hose and cuts off the damaged section of the hose with a pipe cutter. He then slides the remaining section of the hose back into the manifold and reattaches the clamp 603 with screws 601 to the new proper location on the hose 130. By using the unique way of lining the manifold, it protects the steel portion of the manifold 201 from excessive wear and obviates the need for replacement of manifold 201.

Turning to a more detailed view of FIG. 11, it is seen that the wear template 171T consists of two parts. That is, the wear template 171T includes a first part 171a which is attached directly to the lower portion 171U of the bowl 171. Also, this wear template 171T includes a separate wear portion or part 171b, which is removably attached to part 171a by plural bolts 171c (only one of which is seen in FIG. 11) in this embodiment, although the invention is not so limited. The parts 171a and 171b are substantially identical in plan view, as is best seen in FIG. 4. The wear pad 173 makes rubbing contact with the wear part 171b. Accordingly, it will be appreciated that the wear part 171b is removable and when sufficiently worn can be removed to be replaced with a new wear part.

Figure 12:
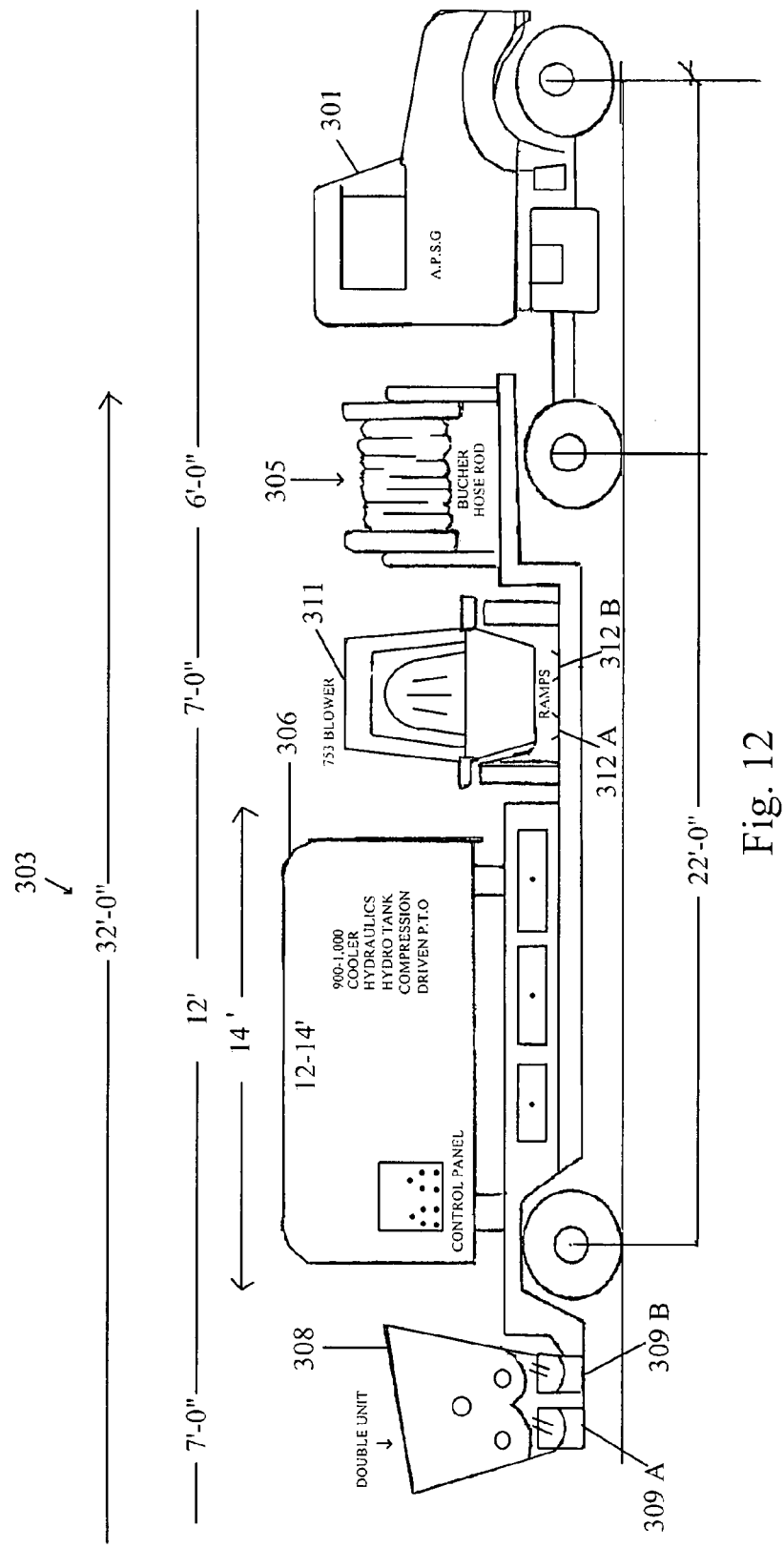
FIG. 12 is another version of the entire system in a tractor-trailer arrangement.

In an alternate version of the present invention, it could be configured as a semi-tractor trailer arrangement, as depicted in FIG. 12. In FIG. 12a tractor unit 301, has a detachably connected trailer unit 303. The trailer unit contains all the features contained in the previously discussed single truck unit above. These are namely, a hose unit 305, which attaches to the rotary air lock mechanism. A compressor 306 powers the entire unit. In the present instance, compressor 306 would power all of the hydraulic systems previously mentioned. Additionally, compressor 306 would provide the compressed air for the rotary air lock mechanism. The connections would be as described above. Additionally, as is well known in the art, a motor compressor such as that depicted in 306 can be used to power several different systems at the same time, given that they have several different connections for powering a multitude of different units. The hopper 308, depicted in FIG. 12 is a double unit, although a single, unit can be used. Two rotary air lock pump mechanisms 309A, and 309B, the same as those described above, operate with this unit. The unit would also carry a small tractor 311, together with ramp sections 312A, and 312B. Given the fact, that in a semi-tractor trailer arrangement such as this, the bed of the trailer can be slung lower to the ground than a typical truck unit. The actual ramp sections would probably be smaller than those described above for a simple truck unit system (see FIGS. 1A and 1B) and have a smaller angle to the ground. This would further facilitate taking the tractor off of the trailer 303, and putting it back on.

A number of advantages of the above unit is that with all of the necessary elements can betaken and left at the site. The tractor unit 301 could be used for other purposes, while the trailer unit 303 is at the site for use.

As stated above, power for the entire system would be provided by compressor motor 306, for this trailer unit to be fully functional. However, the engine compressor unit of the single truck unit described above, could also be used to power all of the systems, namely, the hydraulic, as well as the air compressor systems as described above. In this event, a power take-off unit, utilizing the power of the truck, would not be necessary.

Figure 13:
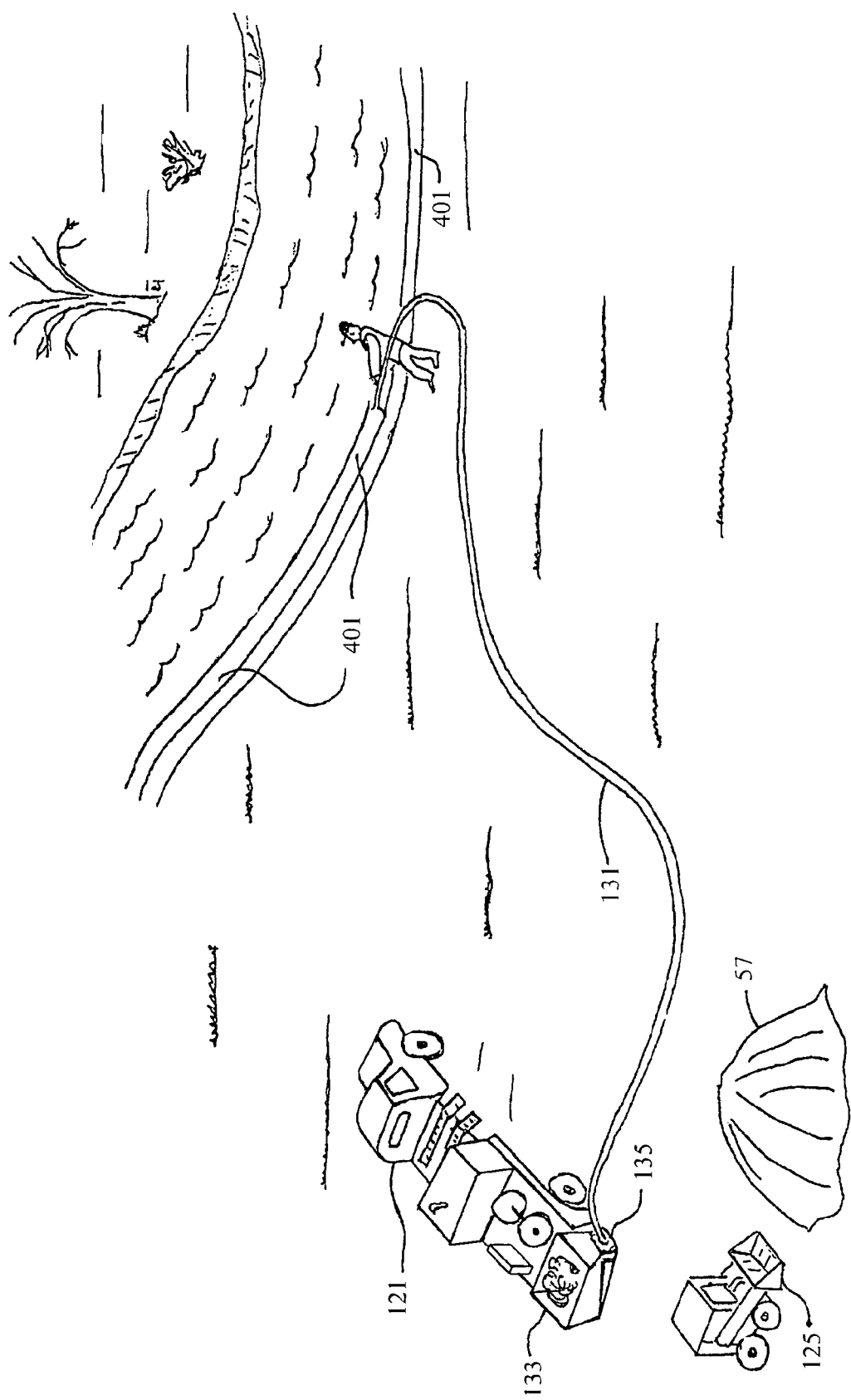
FIG. 13 depicts the system of the present invention being used to fill sandbags.

FIG. 13 depicts a method for filling a tubular sock sand bag 401. Often the locations where sandbags need to be placed are in difficult to reach locations. These often can be stream banks. Additionally filling individual sandbags and transporting them to the location needed is an extremely difficult and labor-intensive process. As can be seen in FIG. 13, the system of the present invention is being used to fill a long tubular sandbag 401 along the edge of a streambed to prevent flooding. Sand 57 would be delivered to a site and discharged into a pile. The tractor-loader 125 would then scoop the sand from pile 57 and discharge it into loading hopper 133 of the sand and gravel pump truck 121. The pump 135 then pumps the sand through hose 131 where it is discharged into a long tubular sandbag 401. By using the present invention as described above and depicted in FIG. 13, regular sandbags or a long tubular sandbag can be filled along an area to prevent flooding which is located several hundred feet from the location of the sand and gravel pump truck 121.

Figure 14:
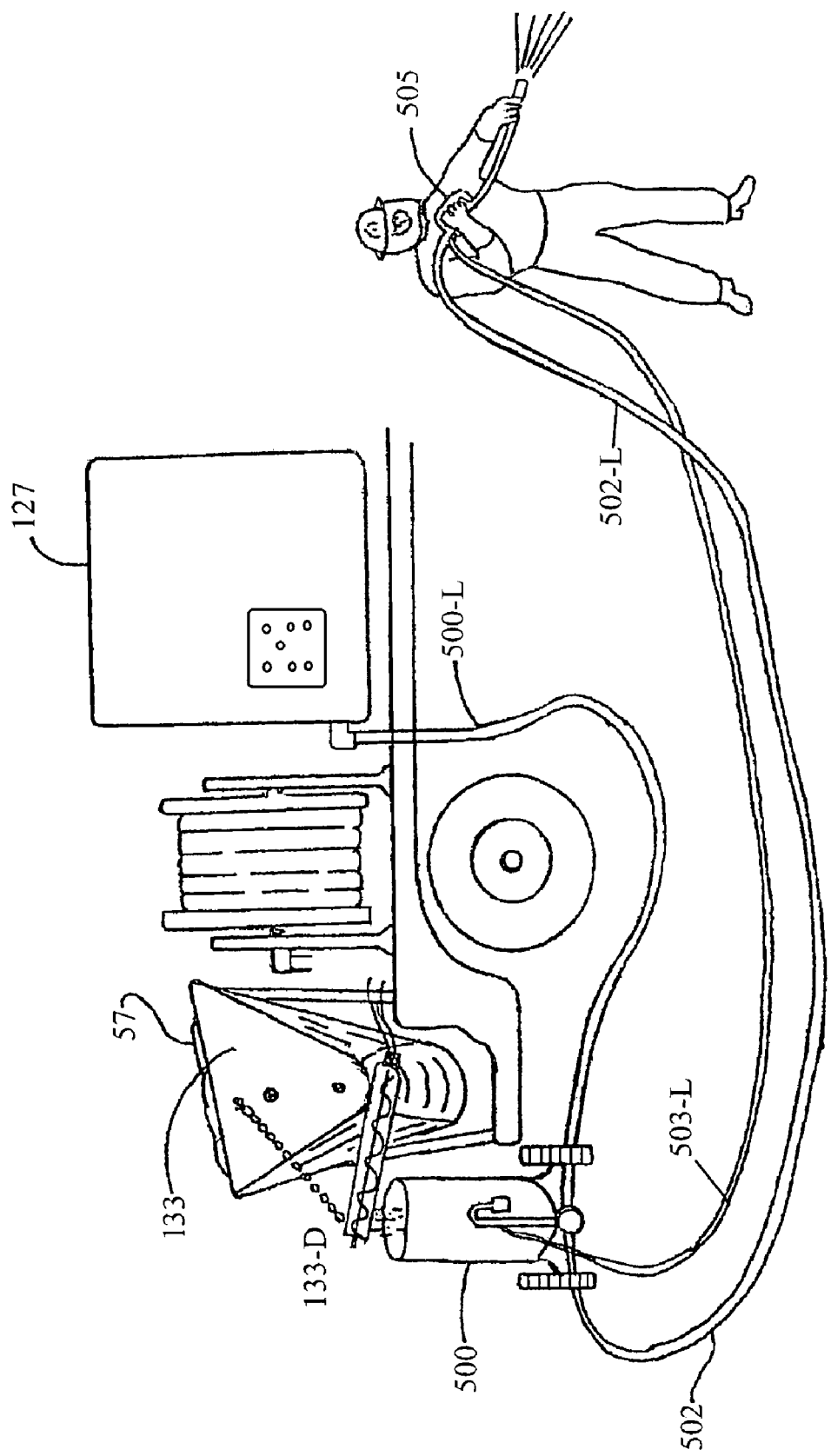
FIG. 14 is a view of the system adapted for sandblasting.

FIG. 14 depicts a method and system for utilizing the present invention in a sandblast operation, adding another operation feature to the present invention. This increases its flexibility and makes it more multi-functional. As used with the current invention, tractor-loader 25, not shown, loads sand, not shown, into truck hopper 133. Compressor 127 provides a source of air. The air travels through line 5011. To the sandblast pot 500. The sandblast pot 500 stores the sand and deposits it into air stream 502L upon demand from the operator, by the manipulation of valve 505. Line 503L is a standard control line used on sandblasting equipment. The loading hopper 133, which can store 1 to 2 cubic yards of sand, discharges it into an adjustable secondary dispensing auger 133D, which fills the sand pot as it voids itself of material. The high air pressure-low sand ratio travels through line 502L and exits through nozzle 505. sandblasting is used in many functions such as paint removal; exposing aggregates for concrete, cleaning, repair of concrete, etceteras.

Figure 15:
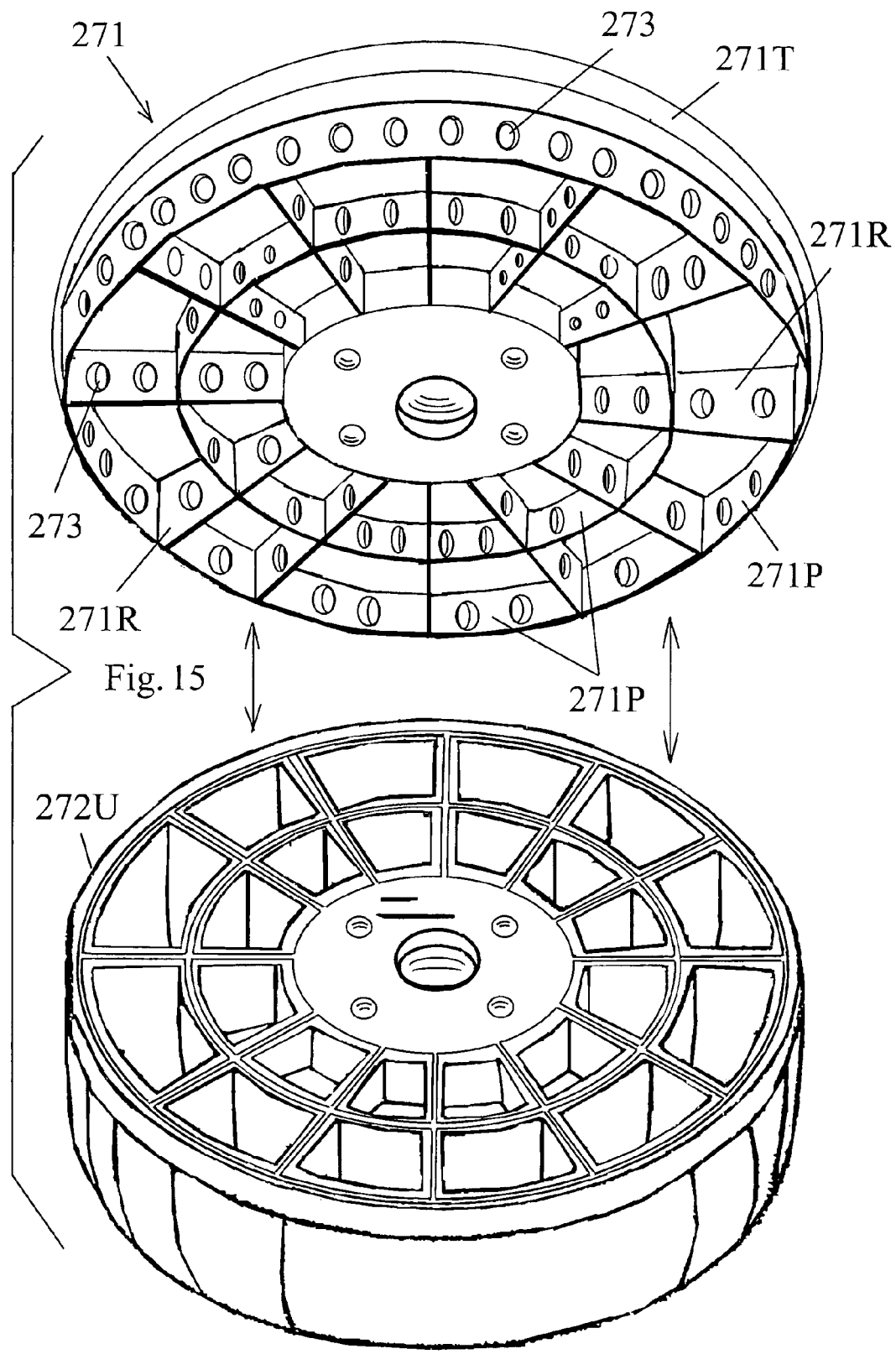
FIG. 15 provides an exploded perspective view of an alternative embodiment of the invention.

Turning now to FIG. 15, an alternative embodiment of the invention is illustrated. Because this alternative embodiment of the invention has many features which are the same or which analogous in structure or function to features illustrated and described above, these features are indicated on FIG. 15 using the same numeral used above, but increased by one-hundred (100). Turning now to FIG. 15, it is seen that the material collection bowl 271 includes a molded polyurethane lower part 271U (i.e., to reduce wear and prevent granular material from sticking to a hot bowl). The bowl 271 also includes a wear template 271T, which may be a two piece assembly including an upper wearable component, and a lower durable component, which lower durable component is permanently attached to the lower part 271U (i.e., by molding of the polyurethane lower part 271U onto this durable component).

Wear template 271T attaches to the lower part 271U to complete bowl 271. In order to assure the mechanical and adhesive bond between wear template 271T and lower bowl portion 271U, the wear template 271T is provided with a radial and circumferentially arrayed plurality of downwardly projecting flange portions 271P and 271R. The flange portions 271 P are like those depicted and described earlier with reference to FIG. 4. However, the flange portions 271R are additional to flanges 271P, and cooperatively define a plurality of radially and circumferentially arrayed intersections 271I. As was described above, an interleaving type of connection 171 S (recalling also FIGS. 4A and 4B) between bowl section 271U and wear template 271T is formed to prevent leakage developing during use of the bowl 271. However, in the embodiment shown in FIG. 15, this interleaving type of connection includes not only circumferentially extending flange sections 271P (i.e., like those described by reference to FIG. 4) but also includes radially extending flange sections 271R. In addition, and importantly, the circumferential and radially extending flange portions define a plurality of intersections or corners 271I, as which the polyurethane material of lower part 271U interlocks with the metal of upper portion 271T. Both the radial and circumferentially extending flange sections 271P and 271R, define plural through holes 273, which provide for interlocking of the polyurethane of lower portion 271U with the metal upper portion 271T (i.e., during the molding of the polyurethane to the shape shown in FIG. 15). This creates a very tight bond and attachment between the polyurethane and the metal that eliminates the problem of delamination of bowl portion 271U from wear template 271T.

Those skilled in the art will appreciate that various adaptation and modification of the just described preferred embodiment can be configured without departing from the scope and spirit of the invention. Therefore, it is to be understood that, within the scope of the appended claims, the invention may be practiced other than as specifically described herein.

We claim:

1. A feed bowl component for a rotary air lock pump mechanism, said feed bowl component comprising:
   a rotational material feed bowl with a plurality of chambers arrayed about a central axis of rotation;
   said material feed bowl at an upper extent including a wear template of metal, and a lower portion made of a hard but light and durable wear resistant polymer material;
   said wear template and said lower portion of said bowl being united into a unitary structure via an interleaving connection cooperatively defined by said wear template and said polymer material of said lower portion;
   said interleaving connection including said wear template including a plurality of radially and circumferentially extending flanges extending into said lower portion.

2. The feed bowl component of claim 1 where in said hard but light durable wear resistant polymer material is selected from a group consisting of polyurethane, polypropylene and polyethylene.

3. The feed bowl component of claim 1 wherein said interleaving connection is configured as a tongue-and-groove type of connection, in which said wear template includes said radially and circumferentially extending and axially projecting flanges, and said flanges cooperatively define a radially and circumferentially arrayed plurality of intersections interlocking with said lower portion of said feed bowl.

4. An improved long-lasting feed bowl component for a rotary air lock pump mechanism, said feed bowl component comprising:
   a rotational material feed bowl with a plurality of chambers arrayed about a central axis of rotation;
   said material feed bowl at an upper extent including a wear template of metal, and a lower portion made of a hard but light and durable wear resistant polymer material;
   said wear template and said lower portion of said bowl being united into a unitary structure both by bonding of said polymer material to said wear template, and by an interleaving connection cooperatively defined by said wear template and said polymer material of said lower portion;
   said interleaving connection including said wear template integrally including a plurality of depending and intersecting respective radially and circumferentially extending flanges projecting axially into said lower portion; at intersections of said depending radial and circumferentially extending flanges plural interior corners being defined at which said depending flanges cooperatively capture said polymer material, and said plurality of depending flanges also cooperatively providing an extended surface area of said wear template to which said polymer material bonds.

5. The feed bowl component of claim 4 where in said hard but light durable wear resistant polymer material is selected from a group consisting of polyurethane, polypropylene and polyethylene.

6. The feed bowl component of claim 4 wherein said interleaving connection is configured as a tongue-and-groove type of connection, in which said wear template includes said radially and circumferentially extending and axially projecting flanges, and said flanges defining a plurality of through apertures through which extends said polymer material to interlock with said wear template.

7. The feed bowl component of claim 4 further including a wear gasket congruent to and overlaying said wear template, said wear gasket securing to and rotating in synchronization with said wear template, whereby said wear template is protected from wear by said wear gasket.

8. An improved, long-life, wear-protected, and partially re-usable feed bowl component for a rotary air lock pump mechanism, said feed bowl component comprising:
a rotational material feed bowl with a plurality of U-shaped chambers arrayed about a central axis of rotation;
said material feed bowl at an upper extent including a wear template of metal, and a lower portion made of a hard but light and durable wear resistant polymer material joined with said metal wear template essentially permanently;
each U-shaped chamber having a first end opening upwardly on an upper face of said wear template in a radially inner circular array of similar first end openings, and each U-shaped chamber having a second end opening also upwardly on said upper face of said wear template in a radially outward circular array of similar second openings, and said plurality of chambers extending in U-shape within said polymer material of said lower portion;
said wear template and said lower portion of said bowl being united into a unitary structure both by bonding of said polymer material to said wear template, and by an interleaving connection cooperatively defined by said wear template and said polymer material of said lower portion;
said interleaving connection including said wear template integrally including a plurality of depending and intersecting respective radially and circumferentially extending flanges projecting axially into said lower portion; at intersections of said depending radial and circumferentially extending flanges plural interior corners being defined at which said depending flanges cooperatively capture said polymer material, and said plurality of depending flanges also cooperatively providing an extended surface area of said wear template to which said polymer material bonds;
said interleaving connection further being configured with said radially and circumferentially extending and axially projecting flanges defining a plurality of through apertures through which extends said polymer material to interlock with said wear template; and
further including a sacrificial wear gasket congruent to and overlaying said wear template, said wear gasket securing to and rotating in synchronization with said wear template and similarly defining a radially inner circular array of first end openings, and a radially outward circular array of similar second openings each communicating through said wear gasket to open on an upper wear-resistant face of said wear gasket, so that said wear template is protected from wear by said wear gasket;
whereby, after the useful life of said feed bowl component said wear template is re-usable by removal and replacement of said wear gasket, and by removal of said polymer of said lower component followed by the essentially permanent forming of a new lower component upon said wear template.

9. The feed bowl component of claim 8 where in said hard but light durable wear resistant polymer material is selected from a group consisting of polyurethane, polypropylene and polyethylene.

* * * * *